(12) United States Patent
Ko et al.

(10) Patent No.: US 9,019,847 B2
(45) Date of Patent: Apr. 28, 2015

(54) METHOD FOR TRANSMITTING EFFECTIVE CHANNEL STATUS INFORMATION IN WIRELESS COMMUNICATION SYSTEM SUPPORTING MULTIPLE CARRIERS

(75) Inventors: Hyunsoo Ko, Anyang-si (KR); Moonil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 662 days.

(21) Appl. No.: 13/244,209

(22) Filed: Sep. 23, 2011

(65) Prior Publication Data

US 2012/0250541 A1 Oct. 4, 2012

Related U.S. Application Data

(60) Provisional application No. 61/431,785, filed on Jan. 11, 2011, provisional application No. 61/432,589, filed on Jan. 14, 2011.

(30) Foreign Application Priority Data

Jun. 2, 2011 (KR) ........................ 10-2011-0053282

(51) Int. Cl.
| H04L 12/26 | (2006.01) |
| H04L 1/00 | (2006.01) |
| H04L 1/06 | (2006.01) |
| H04L 5/00 | (2006.01) |

(Continued)

(52) U.S. Cl.
CPC ............ *H04L 1/0026* (2013.01); *H04L 1/0029* (2013.01); *H04L 1/06* (2013.01);
(Continued)

(58) Field of Classification Search
CPC ..... H04L 43/00; H04L 43/0852; H04L 43/08; H04B 17/00; H04B 17/0012; H04B 17/003; H04W 24/00; H04W 72/04
USPC ......... 370/241, 248, 249, 252, 310, 328, 329, 370/340, 341
See application file for complete search history.

(56) References Cited

U.S. PATENT DOCUMENTS 8,649,280 B2 * 2/2014 Liang et al. .................. 370/252
2010/0098012 A1 4/2010 Bala et al.
(Continued)

FOREIGN PATENT DOCUMENTS

| WO | 2007/126302 | 11/2007 |
| WO | 2009/131099 | 10/2009 |
| WO | 2010077051 | 7/2010 |
| WO | 2010148319 | 12/2010 |

OTHER PUBLICATIONS

European Patent Office Application Serial No. 11855520.0, Search Report dated Feb. 27, 2014, 7 pages.

*Primary Examiner* — Chi H Pham
*Assistant Examiner* — Weibin Huang
(74) *Attorney, Agent, or Firm* — Lee, Hong, Degerman, Kang & Waimey

(57) ABSTRACT

A method and apparatus for transmitting effective channel status information (CSI) in a wireless communication system supporting multiple carriers are disclosed. The method for indicating CSI transmission in a wireless communication system supporting multiple carriers includes transmitting downlink control information (DCI) including a channel quality information (CQI) request field to a user equipment (UE) over a physical downlink control channel (PDCCH), and receiving CSI reporting of a single downlink carrier or multiple downlink carriers from the UE over a physical uplink shared channel (PUSCH) without receiving uplink data. If the CSI for the single downlink carrier is reported, the number ($N_{PRB}$) of resource blocks (RBs) established for the CSI reporting is identical to or less than X ($N_{PRB} \leq X$), and if the CSI for the multiple downlink carriers is reported, $N_{PRB}$ is identical to or less than M (where M>X).

14 Claims, 11 Drawing Sheets

(51) Int. Cl.
  *H04L 25/03* (2006.01)
  *H04W 24/10* (2009.01)
(52) U.S. Cl.
  CPC ............. *H04L 5/001* (2013.01); *H04L 5/0023* (2013.01); *H04L 5/0053* (2013.01); *H04L 5/0057* (2013.01); *H04L 25/03898* (2013.01); *H04W 24/10* (2013.01)

(56) References Cited

U.S. PATENT DOCUMENTS

| | | | |
|---|---|---|---|
| 2010/0278109 A1 | 11/2010 | Papasakellariou et al. | |
| 2011/0249578 A1* | 10/2011 | Nayeb Nazar et al. | 370/252 |
| 2011/0299484 A1* | 12/2011 | Nam et al. | 370/329 |
| 2012/0113909 A1* | 5/2012 | Jen | 370/329 |

* cited by examiner

FIG. 7
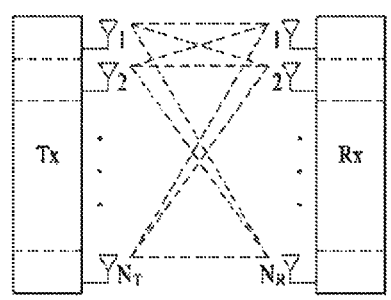
(a)
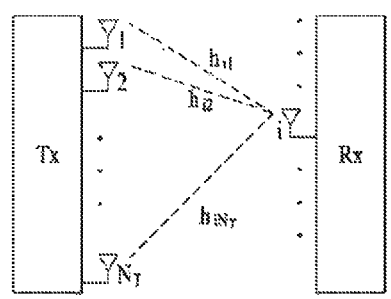
(b)

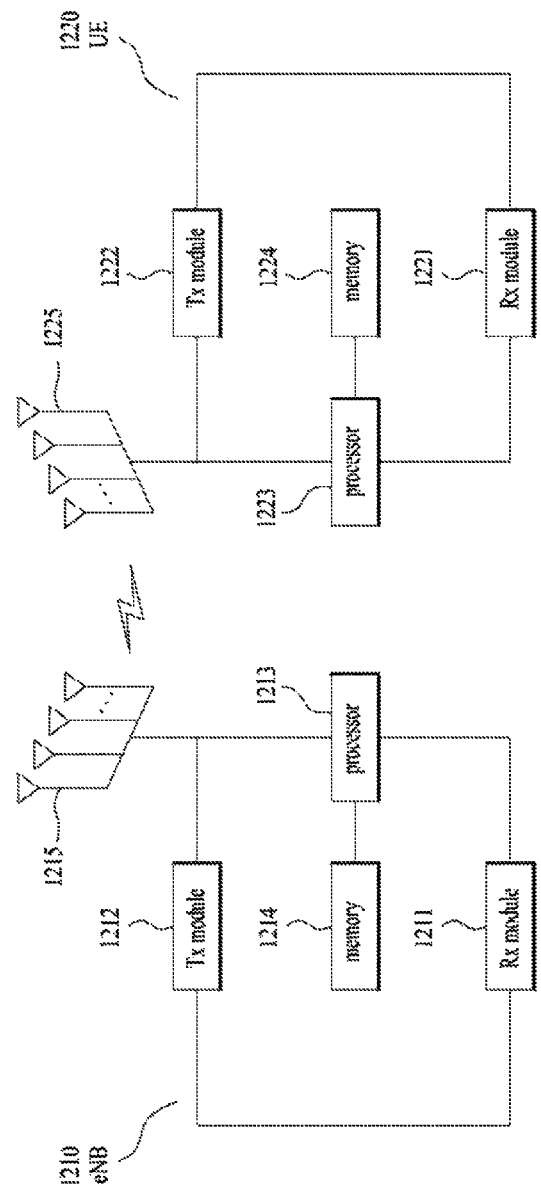

METHOD FOR TRANSMITTING EFFECTIVE CHANNEL STATUS INFORMATION IN WIRELESS COMMUNICATION SYSTEM SUPPORTING MULTIPLE CARRIERS

CROSS-REFERENCE TO RELATED APPLICATIONS

Pursuant to 35 U.S.C. 119, this application claims the benefit of earlier filing date and right of priority to Korean Patent Application No. 10-2011-0053282, filed on Jun. 2, 2011, and also claims the benefit of U.S. Provisional Application Nos. 61/431,785, filed on Jan. 11, 2011, and 61/432,589, filed on Jan. 14, 2011, the contents of which are all hereby incorporated by reference herein in their entirety.

BACKGROUND OF THE INVENTION

1. Field of the Invention

The present invention relates to a wireless communication system, and more particularly to a method and apparatus for transmitting effective channel status information in a wireless communication system supporting multiple carriers.

2. Discussion of the Related Art

Generally, a Multiple-Input Multiple-Output (MIMO) technology will hereinafter be described in detail. In brief, the MIMO technology is an abbreviation of the Multi-Input Multi-Output technology. The MIMO technology uses multiple transmission (Tx) antennas and multiple reception (Rx) antennas to improve the efficiency of transmission/reception (Tx/Rx) data, whereas a conventional art has generally used a single transmission (Tx) antenna and a single reception (Rx) antenna. In other words, the MIMO technology allows a transmitting end and a receiving end to use multiple antennas so as to increase capacity or improve performance. If necessary, the MIMO technology may also be called a multi-antenna technology. In order to correctly perform multi-antenna transmission, the MIMO system has to receive feedback information regarding channels from the receiving end designed to receive multi-antenna channels.

Meanwhile, a conventional wireless communication system constructs an uplink and downlink using one carrier. In order to support the extended bandwidth, a carrier aggregation technology or multi-carrier technology for aggregating a plurality of carriers has been intensively discussed.

SUMMARY OF THE INVENTION

Accordingly, the present invention is directed to a method and apparatus for transmitting effective channel status information in a wireless communication system supporting multiple carriers that substantially obviate one or more problems due to limitations and disadvantages of the related art.

With the introduction of a multi-carrier technology, there is a need for a channel information feedback scheme to be defined. In case of uplink control information transmission, when transmitting channel information regarding downlink multi-carrier transmission via an uplink, there is a need for an effective channel information feedback scheme to be defined.

An object of the present invention is to provide a method and apparatus for feeding back effective channel status information to support multi-carrier transmission. In more detail, when channel status information for downlink multi-carrier transmission is aperiodically fed back over an uplink data channel, the object of the present invention is to provide a method for extending capacity required for reporting channel status information, a method for indicating feedback of channel status information, etc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for indicating channel status information (CSI) transmission in a wireless communication system supporting multiple carriers includes transmitting downlink control information (DCI) including a channel quality information (CQI) request field to a user equipment (UE) over a physical downlink control channel (PDCCH), and receiving channel status information (CSI) reporting of a single downlink carrier or multiple downlink carriers from the user equipment (UE) over a physical uplink shared channel (PUSCH) without receiving uplink data, wherein, if the channel status information (CSI) for the single downlink carrier is reported, the number ($N_{PRB}$) of resource blocks (RBs) established for the CSI reporting is identical to or less than X ($N_{PRB} \leq X$), and if the channel status information (CSI) for the multiple downlink carriers is reported, $N_{PRB}$ is identical to or less than M (where M>X).

In another aspect of the present invention, a method for indicating channel status information (CSI) transmission in a wireless communication system supporting multiple carriers includes receiving downlink control information (DCI) including a channel quality information (CQI) request field from a base station (BS) over a physical downlink control channel (PDCCH), and transmitting channel status information (CSI) reporting of a single downlink carrier or multiple downlink carriers to the base station (BS) over a physical uplink shared channel (PUSCH) without transmitting uplink data, wherein, if the channel status information (CSI) for the single downlink carrier is reported, the number ($N_{PRB}$) of resource blocks (RBs) established for the CSI reporting is identical to or less than X ($N_{PRB} \leq X$), and if the channel status information (CSI) for the multiple downlink carriers is reported, $N_{PRB}$ is identical to or less than M (where M>X).

In another aspect of the present invention, a base station (BS) for indicating channel status information (CSI) transmission in a wireless communication system supporting multiple carriers includes a reception module for receiving an uplink signal from a user equipment (UE), a transmission module for transmitting a downlink signal to the user equipment (UE), and a processor for controlling the base station (BS) including the reception module and the transmission module, wherein the processor transmits, through the transmission module, downlink control information (DCI) including a channel quality information (CQI) request field to the user equipment (UE) over a physical downlink control channel (PDCCH), and receives, through the reception module, channel status information (CSI) reporting of a single downlink carrier or multiple downlink carriers from the user equipment (UE) over a physical uplink shared channel (PUSCH) without receiving uplink data, wherein, if the channel status information (CSI) for the single downlink carrier is reported, the number ($N_{PRB}$) of resource blocks (RBs) established for the CSI reporting is identical to or less than X ($N_{PRB} \leq X$), and if channel status information (CSI) of the multiple downlink carriers is reported, $N_{PRB}$ is identical to or less than M (where M>X).

In another aspect of the present invention, a user equipment (UE) for transmitting channel status information (CSI) in a wireless communication system supporting multiple carriers includes a reception module for receiving a downlink signal from a base station (BS), a transmission module for transmitting an uplink signal to the base station (BS), and a processor for controlling the user equipment (UE) including the reception module and the transmission module, wherein the processor, through the reception module, receives downlink control information (DCI) including a channel quality information (CQI) request field from a base station (BS) over a physical downlink control channel (PDCCH), and transmits, through the transmission module, channel status information (CSI) reporting of a single downlink carrier or multiple downlink carriers to the base station (BS) over a physical uplink shared channel (PUSCH) without transmitting uplink data, wherein, if the channel status information (CSI) for the single downlink carrier is reported, the number ($N_{PRB}$) of resource blocks (RBs) established for the CSI reporting is identical to or less than X ($N_{PRB} \leq X$), and if the channel status information (CSI) for the multiple downlink carriers is reported, $N_{PRB}$ is identical to or less than M (where M>X).

The CQI request field may be 2 bits long, and a bit value of the CQI request field may be assigned a specific value indicating aperiodic CSI reporting.

The downlink control information (DCI) may further include a modulation and coding scheme (MCS) index ($I_{MCS}$), where $I_{MCS}$ is set to 29.

The $I_{MCS}$ value may indicate a value regarding an enabled transport block (TB).

The X value may be set to 4.

The M value may be set to 20.

The channel status information (CSI) may include at least one of a channel quality indicator (CQI), a precoding matrix index (PMI), and a rank indicator (RI).

The channel status information (CSI) for the single downlink carrier may be modulated according to a QPSK (Quadrature Phase Shift Keying) scheme, and the channel status information (CSI) for the multiple downlink carriers may be modulated according to a QPSK or 16QAM (Quadrature Amplitude Modulation) scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a conceptual diagram illustrating a MIMO communication system;

FIG. 12 is a block diagram illustrating an eNB apparatus and a user equipment (UE) apparatus according to an embodiment of the present invention.

DETAILED DESCRIPTION OF THE INVENTION

Figure 1:
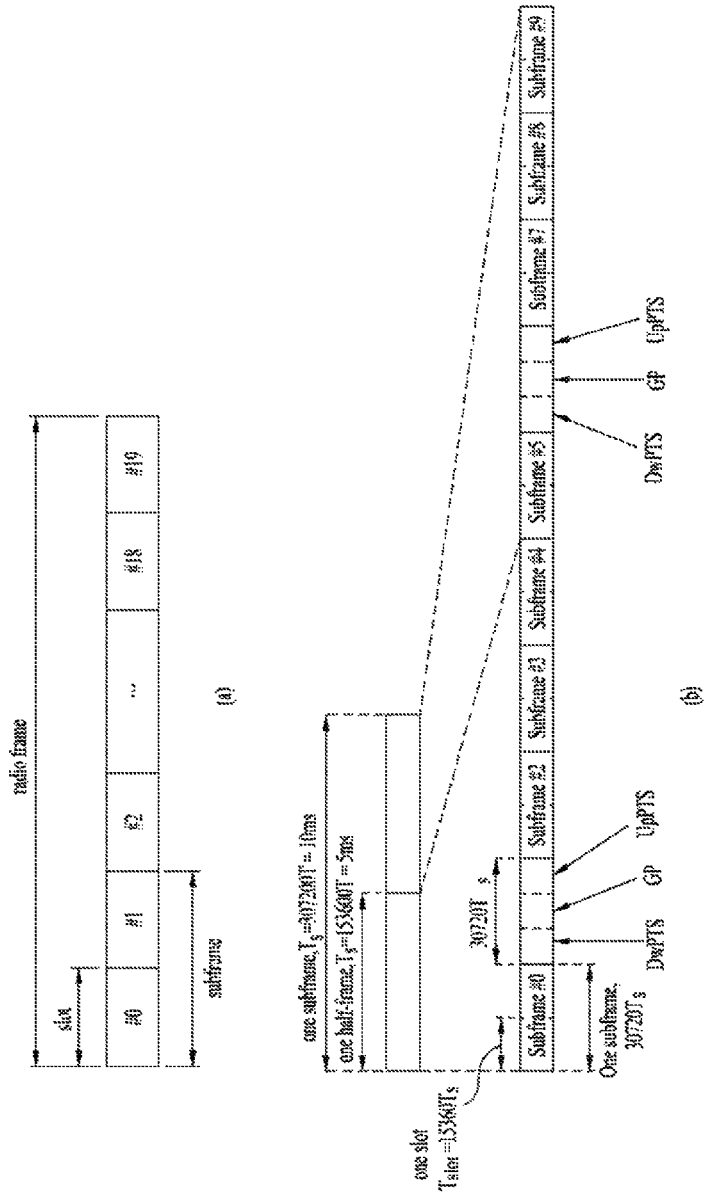
FIG. 1 exemplarily shows a radio frame structure for use in a 3rd Generation Partnership Project Long Term Evolution (3GPP LTE) system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency region. Since the 3GPP LTE system uses OFDMA in downlink, the OFDM symbol indicates one symbol duration. The OFDM symbol may be called a SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel status is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform an initial cell search, synchronization, or channel estimation. UpPTS is used to perform channel estimation of a base station and uplink transmission synchronization of a user equipment (UE). The guard interval (GP) is located between an uplink and a downlink so as to remove an interference generated in the uplink due to a multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
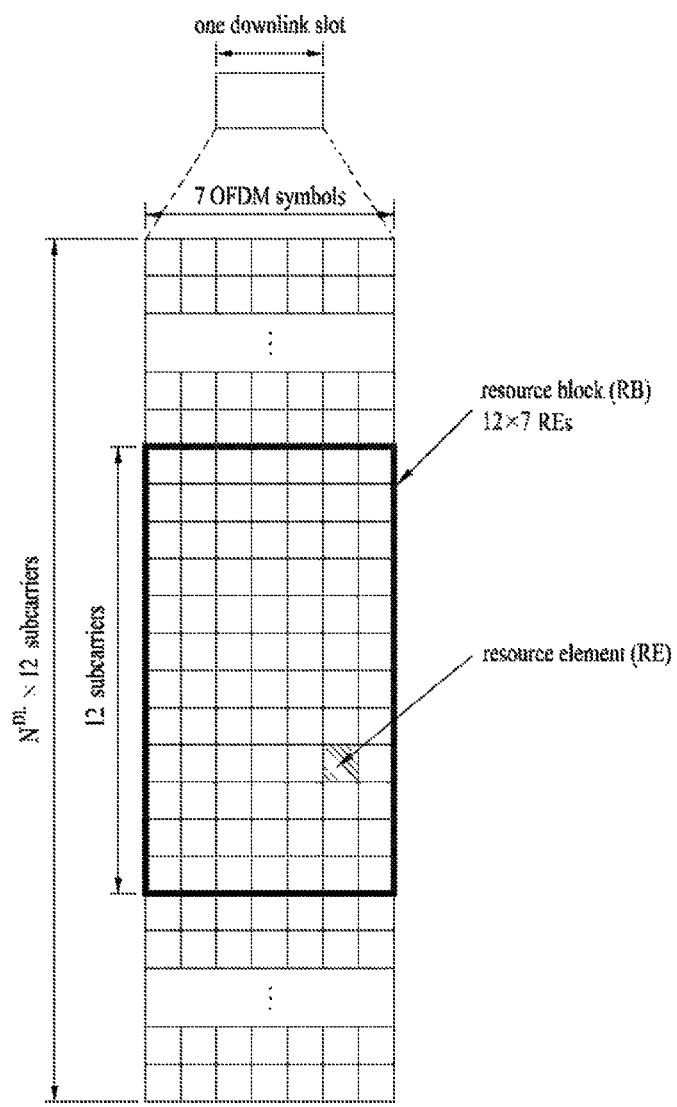
FIG. 2 exemplarily shows a resource grid of a downlink (DL) slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 3:
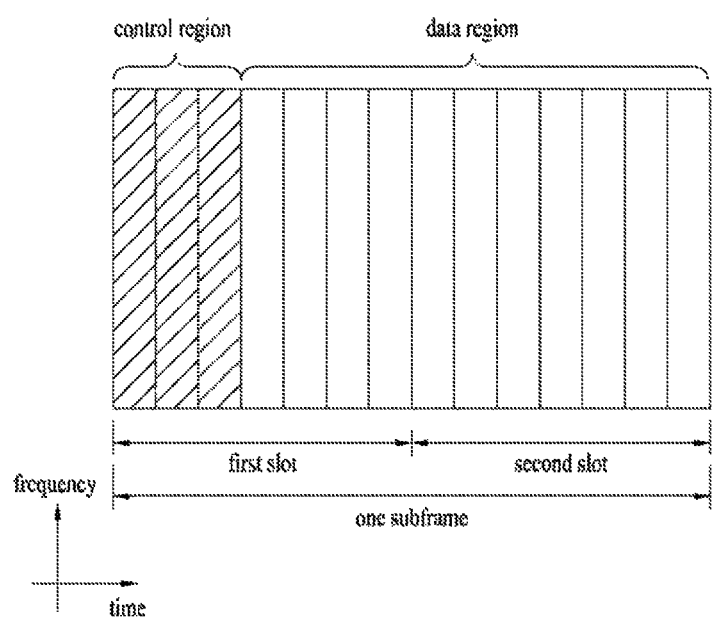
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
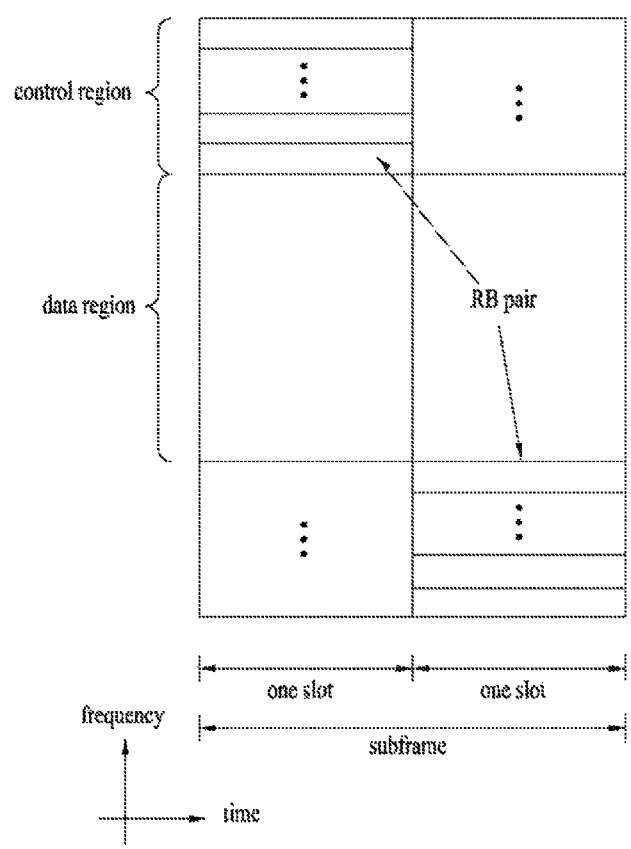
FIG. 4 is an uplink (UL) subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

Carrier Aggregation

Although downlink and uplink bandwidths are different, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is not easy in the world except for some regions. Accordingly, a technology for efficiently using small segmented bands, known as carrier aggregation (bandwidth aggregation) or spectrum aggregation, has been developed in order to aggregate a plurality of physical bands to a logical wider band.

Carrier aggregation was introduced to support increased throughput, prevent a cost increase caused by introduction of wideband RF devices, and ensure compatibility with legacy systems. Carrier, aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs). Carrier aggregation using one or more CCs may apply to each of the downlink and the uplink. Carrier aggregation may support a system bandwidth of up to 100 MHz by aggregating up to five CCs each having a bandwidth of 5, 10 or 20 MHz.

A downlink CC and an uplink CC may be represented as a DL CC and a UL CC, respectively. A carrier or CC may be represented as a cell in terms of function configuration in the 3GPP LTE system. Thus, a DL CC and a UL CC may be referred to as a DL cell and a UL cell, respectively. Hereinbelow, the term 'carriers', 'component carriers', 'CCs' or "cells" will be used to signify a plurality of carriers to which carrier aggregation is applied.

While the following description exemplarily uses an eNB (BS) or cell as a downlink transmission entity and exemplarily uses a UE as an uplink transmission entity, the scope or spirit of the present invention is not limited thereto. That is, even when a relay node (RN) may be used as a downlink transmission entity from an eNB to a UE and or be used as an uplink reception entity from a UE to an eNB, or even when the RN may be used an uplink transmission entity for a UE or be used as a downlink reception entity from an eNB, it should be noted that the embodiments of the present invention can be applied without difficulty.

Downlink carrier aggregation may be described as an eNB's supporting downlink transmission to a UE in frequency resources (subcarriers or physical resource blocks [PRBs]) of one or more carrier bands in time resources (allocated in units of a subframe). Uplink carrier aggregation may be described as a UE's supporting uplink transmission to an eNB in frequency resources (subcarriers or PRBs) of one or more carrier bands in time resources (allocated in units of a subframe).

Figure 5:
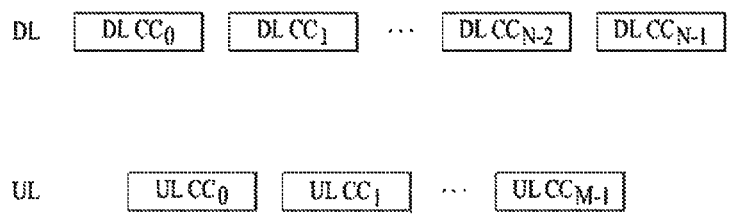
FIG. 5 is a conceptual diagram illustrating downlink (DL) and uplink (UL) component carriers (CCs)

FIG. 5 is a conceptual diagram illustrating downlink (DL) and uplink (UL) component carriers (CCs). Referring to FIG. 5, DL and UL CCs may be assigned from an eNB (cell) or RN. For example, the number of DL CCs may be set to N and the number of UL CCs may be set to M.

Through the UE's initial access or initial deployment process, after RRC connection is established on the basis of one arbitrary CC for DL or UL (cell search) (for example, system information acquisition/reception, initial random access process, etc.), a unique carrier setup for each UE may be provided from a dedicated signaling (UE-specific RRC signaling or UE-specific L1/L2 PDCCH signaling). For example, assuming that a carrier setup for UE is commonly achieved in units of an eNB (cell or cell-cluster), the UE carrier setup may also be provided through cell-specific RRC signaling or cell-specific UE-common L1/L2 PDCCH signaling. In another example, carrier component information for use in an eNB may be signaled to a UE through system information for RRC connection setup, or may also be signaled to additional system information or cell-specific RRC signaling upon completion of the RRC connection setup.

While DL/UL CC setup has been described, centering on the relationship between an eNB and a UE, to which the present invention is not limited, an RN may also provide DL/UL CC setup to a UE contained in an RN region. In addition, in association with a RN contained in an eNB region, the eNB may also provide DL/UL CC setup of the corresponding RN to the RN of the eNB region. For clarity, while the following description will disclose DL/UL CC setup on the basis of the relationship between the eNB and the UE, it should be noted that the same content may also be applied to the relationship between the RN and the UE (i.e., an access uplink and downlink) or the relation between the eNB and the RN (backhaul uplink or downlink) without departing from the scope or spirit of the present invention.

When the above-mentioned DL/UL CCs are uniquely assigned to individual UEs, DL/UL CC linkage may be implicitly or explicitly established through arbitrary signaling parameter definition.

Figure 6:
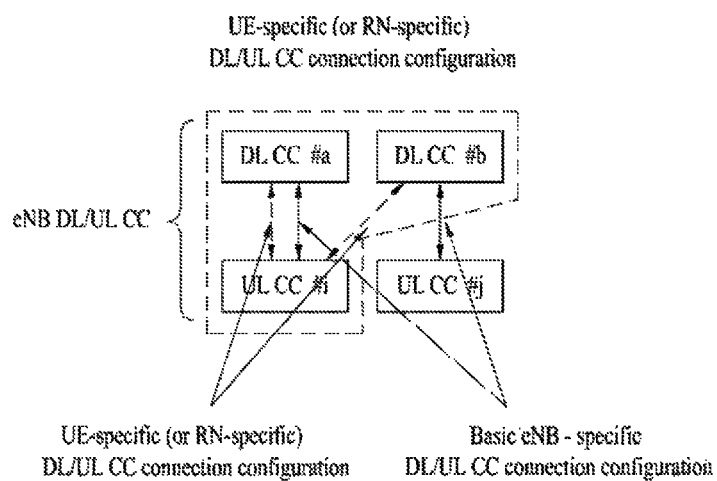
FIG. 6 shows an exemplary linkage of DL/UL CCs.

FIG. 6 shows an exemplary linkage of DL/UL CCs. In more detail, when an eNB configures two DL CCs (DL CC #a and DL CC #b) and two UL CCs (UL CC #i and UL CC #j), FIG. 6 shows a DL/UL CC linkage defined when two DL CCs (DL CC #a and DL CC #b) and one UL CC (UL CC #i) are assigned to an arbitrary UE.

In a DL/UL CC linkage setup shown in FIG. 6, a solid line indicates a linkage setup between DL CC and UL CC that are basically constructed by an eNB, and this linkage setup between DL CC and UL CC may be defined in "System Information Block (SIB) 2". In the DL/UL CC linkage setup shown in FIG. 6, a dotted line indicates a linkage setup between DL CC and UL CC established in a specific UE. The above-mentioned DL CC and UL CC linkage setup shown in FIG. 6 is disclosed only for illustrative purposes, and the scope or spirit of the present invention is not limited thereto. That is, in accordance with various embodiments of the present invention, the number of DL CCs or UL CCs configured by eNB may be set to an arbitrary number. Thus, the number of UE-specific DL CCs or the number of UE-specific UL CCs in the above-mentioned DL CCs or UL CCs may be set to an arbitrary number, and associated DL/UL CC linkage may be defined in a different way from that of FIG. 6.

From among DL CCs and UL CCs configured or established for an arbitrary UE to achieve a series of specific purposes, a primary CC (PCC), or a primary cell (P-cell) or an anchor CC (also called an anchor cell) may be established. For example, a DL PCC (or DL P-cell) aiming to transmit configuration/reconfiguration information on RRC connection setup may be established. In another example, UL CC for transmitting PUCCH to be used when an arbitrary UE transmits UCI that must be transmitted on uplink may be established as UL PCC (or UL P-cell). For convenience of description, it is assumed that one DL PCC (P-cell) and one UL PCC (P-cell) are basically assigned to each UE. Alternatively, if a large number of CCs is assigned to UE or if CCs can be assigned from a plurality of eNBs, one or more DL PCCs (P-cells) and/or one or more UL PCCs (P-cells) may be assigned from one or more eNBs to an arbitrary UE. For the linkage between DL PCC (P-cell) and UL PCC (P-cell), a UE-specific configuration method may be considered by eNB as necessary. To implement a more simplified method, a linkage between DL PCC (P-cell) and UL PCC (P-cell) may be configured on the basis of the relationship of basic linkage that has been defined in LTE Release-8 (LTE Rel-8) and signaled to System Information Block (or Base) 2. DL PCC (P-cell) and UL PCC (P-cell) for the above-mentioned linkage configuration are grouped so that the grouped result may be denoted by a UE-specific P-cell.

MIMO System

MIMO technology is not dependent on one antenna path to receive one total message, collects a plurality of data pieces received via several antennas, and completes total data. As a result, MIMO technology can increase a data transfer rate within a specific range, or can increase a system range at a specific data transfer rate. Under this situation, MIMO technology is a next-generation mobile communication technology capable of being widely applied to mobile communication terminals or RNs. MIMO technology can extend the range of data communication, so that it can overcome the limited amount of transmission (Tx) data of mobile communication systems reaching a critical situation.

FIG. 7(a) is a block diagram illustrating a general MIMO communication system. Referring to FIG. 7(a), if the number of transmission (Tx) antennas increases to $N_T$, and at the same time the number of reception (Rx) antennas increases to $N_R$, a theoretical channel transmission capacity of the MIMO communication system increases in proportion to the number of antennas, differently from the above-mentioned case in which only a transmitter or receiver uses several antennas, so that a transfer rate and a frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four transmission (Tx) antennas and four reception (Rx) antennas, the MIMO system can theoretically acquire a high transfer rate which is four times higher than that of a one antenna system. After the above-mentioned theoretical capacity increase of the MIMO system was demonstrated in the mid-1990s, many developers began to conduct intensive research into a variety of technologies which can substantially increase a data transfer rate using the theoretical capacity increase. Some of the above technologies have been reflected in a variety of wireless communication standards, for example, a third-generation mobile communication or a next-generation wireless LAN, etc.

A variety of MIMO-associated technologies have been intensively researched by many companies or developers, for example, research into an information theory associated with a MIMO communication capacity calculation under various channel environments or multiple access environments, research into a radio frequency (RF) channel measurement and modeling of the MIMO system, and research into a space-time signal processing technology.

A mathematical modeling of a communication method for use in the above-mentioned MIMO system will hereinafter be described in detail. As can be seen from FIG. 7(a), it is assumed that there are $N_T$ transmission (Tx) antennas and $N_R$ reception (Rx) antennas. In the case of a transmission (Tx) signal, a maximum number of transmission information pieces is $N_T$ under the condition that $N_T$ transmission (Tx) antennas are used, so that the transmission (Tx) information can be represented by a specific vector shown in the following equation 2.

$$s\lfloor s_1, s_2, \ldots, s_{N_T} \rfloor^T \quad \text{[Equation 2]}$$

In the meantime, individual transmission (Tx) information pieces ($s_1, s_2, \ldots s_{N_T}$) may have different transmission powers. In this case, if the individual transmission powers are denoted by ($P_1, P_2, \ldots P_{N_T}$), transmission (Tx) information having an adjusted transmission power can be represented by a specific vector shown in the following equation 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

In Equation 3, ŝ is a transmission vector, and can be represented by the following equation 4 using a diagonal matrix P of a transmission (Tx) power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} \quad \text{[Equation 4]}$$

$$= Ps$$

In the meantime, the information vector Ŝ having an adjusted transmission power is applied to a weight matrix (W), so that $N_T$ transmission (Tx) signals $(x_1, x_2, \ldots, x_{NT})$ to be actually transmitted are configured. In this case, the weight matrix (W) is adapted to properly distribute transmission (Tx) information to individual antennas according to transmission channel situations. The above-mentioned transmission (Tx) signals $(x_1, x_2, \ldots, x_{NT})$ can be represented by the following equation 5 using the vector (X).

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Next, if $N_R$ reception (Rx) antennas are used, reception (Rx) signals $(y_1, y_2, \ldots, y_{NR})$ of individual antennas can be represented by a specific vector (y) shown in the following equation 6.

$$y=[y_1,y_2,\ldots,y_{N_R}]^T \quad \text{[Equation 6]}$$

In the meantime, if a channel modeling is executed in the MIMO communication system, individual channels can be distinguished from each other according to transmission/reception (Tx/Rx) antenna indexes. A specific channel passing the range from a transmission (Tx) antenna (j) to a reception (Rx) antenna (i) is denoted by $h_{ij}$. In this case, it should be noted that the index order of the channel $h_{ij}$ is located before a reception (Rx) antenna index and is located after a transmission (Tx) antenna index.

Several channels are tied up, so that they are displayed in the form of a vector or matrix. An exemplary vector is as follows. FIG. 7(b) shows channels from $N_T$ transmission (Tx) antennas to a reception (Rx) antenna (i).

Referring to FIG. 7(b), the channels passing the range from the $N_T$ transmission (Tx) antennas to the reception (Rx) antenna (i) can be represented by the following equation 7.

$$h_i^T=[h_{i1},h_{i2},\ldots,h_{iN_T}] \quad \text{[Equation 7]}$$

If all channels passing the range from the $N_T$ transmission (Tx) antennas to $N_R$ reception (Rx) antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} \quad \text{[Equation 8]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$

Additive white Gaussian noise (AWGN) is added to an actual channel which has passed the channel matrix (H) shown in Equation 8. The AWGN $(n_1, n_2, \ldots, n_{N_R})$ added to each of $N_R$ reception (Rx) antennas can be represented by a specific vector shown in the following equation 9.

$$n=[n_1,n_2,\ldots,n_{N_R}]^T \quad \text{[Equation 9]}$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the number of rows and the number of columns of a channel matrix H indicating a channel condition are determined by the number of Tx/Rx antennas. In the channel matrix H, the number of rows is equal to the number $(N_R)$ of Rx antennas, and the number of columns is equal to the number $(N_T)$ of Tx antennas. Namely, the channel matrix H is denoted by $N_R \times N_T$ matrix. Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \le \min(N_T, N_R) \quad \text{[Equation 13]}$$

Figure 8:
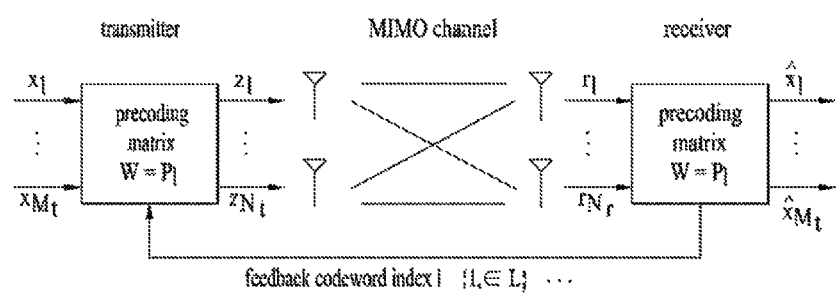
FIG. 8 is a conceptual diagram illustrating codebook-based precoding.

In association with the above-mentioned MIMO transmission techniques, the codebook-based precoding method will hereinafter be described with reference to FIG. 8. FIG. 8 is a conceptual diagram illustrating codebook-based precoding.

In accordance with the codebook-based precoding scheme, a transceiver may share codebook information including a predetermined number of precoding matrixes according to a transmission rank, the number of antennas, etc. That is, if feedback information is infinite, the precoding-based codebook scheme may be used. The receiver measures a channel status through a reception signal, so that an infinite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likehood) or MMSE (Minimum Mean Square Error) scheme. Although the receiver shown in FIG. 8 transmits precoding matrix information for each codeword to the transmitter, the scope or spirit of the present invention is not limited thereto.

Upon receiving feedback information from the receiver, the transmitter may select a specific precoding matrix from a codebook on the basis of the received information. The transmitter that has selected the precoding matrix performs a precoding operation, by multiplying the selected precoding matrix by as many layer signals as the number of transmission ranks, and may transmit each precoded Tx signal over a plurality of antennas. If the receiver receives the precoded signal from the transmitter as an input, it performs inverse processing of the precoding having been conducted in the transmitter so that it can recover the reception (Rx) signal. Generally, the precoding matrix satisfies a unitary matrix (U) such as ($U*U^H=I$), so that the inverse processing of the above-mentioned precoding may be conducted by multiplying a Hermit matrix ($P^H$) of the precoding matrix H used in the precoding of the transmitter by the reception (Rx) signal.

Channel Status Information Feedback

In order to correctly perform MIMO technology, the receiver may feed back a rank indicator (RI), a precoding matrix index (PMI) and a channel quality indicator (CQI) to the transmitter. RI, PMI and CQI may be generically named Channel Status Information (CSI) as necessary. Alternatively, the term "CQI" may be used as the concept of channel information including RI, PMI and CQI.

Figure 9:
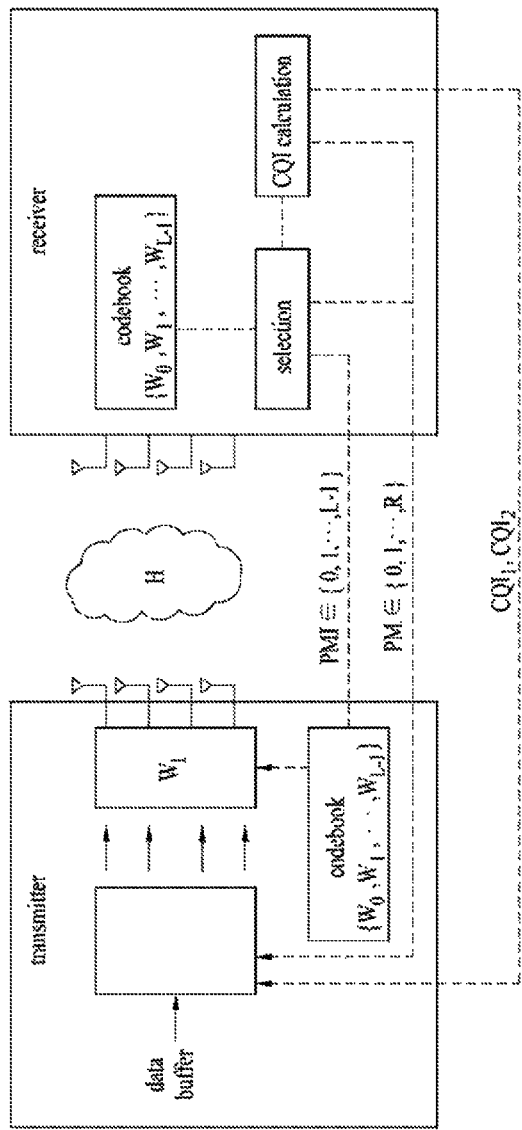
FIG. 9 is a conceptual diagram illustrating a feedback of channel status information.

FIG. 9 is a conceptual diagram illustrating a feedback of channel status information.

Referring to FIG. 9, MIMO transmission data from the transmitter may be received at a receiver over a channel (H). The receiver may select a preferred precoding matrix from a codebook on the basis of the received signal, and may feed back the selected PMI to the transmitter. In addition, the receiver may measure a Signal-to-Interference plus Noise Ratio (SINR) of the reception (Rx) signal, calculate channel quality information (CQI), and feed back the calculated CQI to the transmitter. In addition, the receiver may measure a Signal-to-Interference plus Noise Ratio (SINR) of the reception (Rx) signal, calculate a CQI, and feed back the calculated SINR to the transmitter. In addition, the receiver may feed back a rank indicator (RI) of the Rx signal to the transmitter. The transmitter may determine the number of layers suitable for data transmission to the receiver and time/frequency resources, MCS (Modulation and Coding Scheme), etc. using RI and CQI information fed back from the receiver. In addition, the receiver may transmit the precoded Tx signal using the precoding matrix ($W_l$) indicated by a PMI fed back from the receiver over a plurality of antennas.

Channel status information will hereinafter be described in detail.

RI is information regarding a channel rank (i.e., the number of layers for data transmission of a transmitter). RI may be determined by the number of allocated Tx layers, and may be acquired from associated downlink control information (DCI).

PMI is information regarding a precoding matrix used for data transmission of a transmitter. The precoding matrix fed back from the receiver may be determined considering the number of layers indicated by RI. PMI may be fed back in case of a closed-loop spatial multiplexing (SM) and a large delay cyclic delay diversity (CDD). In the case of an open-loop transmission, the transmitter may select a precoding matrix according to the predetermined rules. A process for selecting a PMI for each rank is as follows. The receiver may calculate an SINR pre-processed in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI feedback from the receiver may use a precoding matrix recommended by the receiver. This fact may be contained as 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information. For details of PMI; the 3GPP standard document (e.g., 3GPP TS36.211) may be referred to.

CQI is information regarding a channel quality. CQI may be represented by a predetermined MCS combination. CQI index may be given as shown in the following table 1.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Referring to Table 1, CQI index may be represented by 4 bits (i.e., CQI indexes of 0~15). Each CQI index may indicate a modulation scheme and a code rate.

A CQI calculation method will hereinafter be described. The following assumptions (1) to (5) for allowing a UE to calculate a CQI index are defined in the 3GPP standard document (e.g., 3GPP TS36.213).

(1) First three OFDM symbols in one subframe are occupied by control signaling.

(2) Resource element (RE) used by a primary synchronization signal, a secondary synchronization signal or a physical broadcast channel (PBCH) is not present.

(3) CP length of a non-MBSFN subframe is assumed.

(4) Redundancy version is set to zero (0).

(5) PDSCH transmission method may be dependent upon a currently transmission mode (e.g., a default mode) established in a UE.

(6) The ratio of PDSCH EPRE (Energy Per Resource Element) to a cell-specific reference signal EPRE may be given with the exception of $\rho_A$. (A detailed description of $\rho_A$ may follow the following assumption. Provided that a UE for an arbitrary modulation scheme may be set to a Transmission Mode 2 having four cell-specific antenna ports or may be set to a Transmission Mode 3 having an RI of 1 and four cell-specific antenna ports, $\rho_A$ may be denoted by $\rho_A = P_A + \Delta_{offset} + 10 \log_{10}(2)[dB]$. In the remaining cases, in association with an arbitrary modulation method and the number of arbitrary layers, $\rho_A$ may be denoted by $\rho_A = P_A + \Delta_{offset}[dB]$. $\Delta_{offset}$ is given by a nomPDSCH-RS-EPRE-Offset parameter established by upper layer signaling.)

Definition of the above-mentioned assumptions (1) to (5) may indicate that a CQI includes not only a CQI but also various information of a corresponding UE. That is, different CQI indexes may be fed back according to a throughput or performance of the corresponding UE at the same channel quality, so that it is necessary to define a predetermined reference for the above-mentioned assumption.

The UE may receive a downlink reference signal (DL RS) from an eNB, and recognize a channel status on the basis of the received DL RS. In this case, the RS may be a common reference signal (CRS) defined in the legacy 3GPP LTE system, and may be a Channel Status Information Reference Signal (CSI-RS) defined in a system (e.g., 3GPP LTE-A system) having an extended antenna structure. The UE may satisfy the assumption given for CQI calculation at a channel recognized through a reference signal (RS), and at the same time calculate a CQI index in which a Block Error Rate (BLER) is not higher than 10%. The UE may transmit the calculated CQI index to the eNB. The UE may not apply a method for improving interference estimation to a CQI index calculation process.

The process for allowing the UE to recognize a channel status and calculate an appropriate MCS may be defined in various ways in terms of UE implementation. For example, the UE may calculate a channel status or an effective SINR using a reference signal (RS). In addition, the channel status or the effective SINR may be measured on the entire system bandwidth (also called 'Set S') or may also be measured on some bandwidths (specific subband or specific RB). The CQI for the set S may be referred to as a Wideband WB CQI, and the CQI for some bandwidths may be referred to as a subband (SB) CQI. The UE may calculate the highest MCS on the basis of the calculated channel status or effective SINR. The highest MCS may indicate an MCS that satisfies the CQI calculation assumption without exceeding a transport block error rate of 10% during the decoding. The UE may determine a CQI index related to the calculated MCS, and may report the determined CQI index to the eNB.

In the meantime, CQI-only transmission may be considered in which a UE transmits only a CQI. Aperiodic CQI transmission may be event-triggered upon receiving a request from the eNB. Such request from the eNB may be a CQI request field defined by one bit on DCI format 0. In addition, for CQI-only transmission, MCS index ($I_{MCS}$) of 29 may be signaled as shown in the following table 2. In this case, the CQI request bit of the DCI format 0 is set to 1, transmission of 4 RBs or less may be established (i.e., the number of PRBs in which UL transmission is used is set to 4 RBs or less, $N_{PRB} \leq 4RBs$), Redundancy Version 1 (RV1) is indicated in PUSCH data retransmission, and a modulation order ($Q_m$) may be set to 2. In other words, in the case of CQI-only transmission, only a QPSK (Quadrature Phase Shift Keying) scheme may be used as a modulation scheme.

TABLE 2

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The CQI reporting operation will hereinafter be described in detail.

In the 3GPP LTE system, when a DL reception entity (e.g., UE) is coupled to a DL transmission entity (e.g., eNB), a Reference Signal Received Power (RSRP) and a Reference Signal Received Quality (RSRQ) that are transmitted via downlink are measured at an arbitrary time, and the measured result may be periodically or event-triggeredly reported to the eNB.

In a cellular OFDM wireless packet communication system, each UE may report DL channel information based on a DL channel condition via uplink, and the eNB may determine, me/frequency resources and MCS (Modulation and Coding Scheme) so as to transmit data to each UE using DL channel information received from each UE.

In case of the legacy 3GPP LTE system (e.g., 3GPP LTE Release-8 system), such channel information may be composed of Channel Quality Indication (CQI), Precoding Matrix Indicator (PMI), and Rank Indication (RI). All or some of CQI, PMI and RI may be transmitted according to a transmission mode of each UE. CQI may be determined by the received signal quality of the UE. Generally, CQI may be determined on the basis of DL RS measurement. In this case, a CQI value actually applied to the eNB may correspond to an MCS in which the UE maintains a Block Error Rate (BLER) of 10% or less at the measured Rx signal quality and at the same time has a maximum throughput or performance. In addition, such channel information reporting scheme may be divided into periodic reporting and aperiodic reporting upon receiving a request from the eNB.

Information regarding the aperiodic reporting may be assigned to each UE by a CQI request field of 1 bit contained in uplink scheduling information sent from the eNB to the UE. Upon receiving the aperiodic reporting information, each UE may transmit channel information considering the UE's transmission mode to the eNB over a physical uplink shared channel (PUSCH). If necessary, RI and CQI/PMI may not be transmitted over the same PUSCH.

In case of the aperiodic reporting, a period in which channel information is transmitted via an upper layer signal, an offset of the corresponding period, etc. may be signaled to each UE in units of a subframe, and channel information considering a transmission (Tx) mode of each UE may be transmitted to the eNB over a physical uplink control channel (PUCCH) at intervals of a predetermined time. In the case where UL transmission data is present in a subframe to which channel information is transmitted at intervals of a predetermined time, the corresponding channel information may be transmitted together with data over not a PUCCH but a PUSCH together. In case of the periodic reporting over a PUCCH, a limited number of bits may be used as compared to PUSCH. RI and CQI/PMI may be transmitted over the same PUSCH. If the periodic reporting collides with the aperiodic reporting, only the aperiodic reporting may be performed within the same subframe.

In order to calculate a WB CQI/PMI, the latest transmission RI may be used. In a PUCCH reporting mode, RI may be independent of another RI for use in a PUSCH reporting mode. RI may be effective only at CQI/PMI for use in the corresponding PUSCH reporting mode.

The CQI/PMI/RI feedback type for the PUCCH reporting mode may be classified into four feedback types (Type 1 to Type 4). Type 1 is a CQI feedback for a user-selected subband. Type 2 is a WB CQI feedback and a WB PMI feedback. Type 3 is an RI feedback. Type 4 is a WB CQI feedback.

Referring to Table 3, in the case of periodic reporting of channel information, a reporting mode is classified into four reporting modes (Modes 1-0, 1-1, 2-0 and 2-1) according to CQI and PMI feedback types.

Diversity (TD), and a single antenna are used, and 'Single PMI' may correspond to an exemplary case in which a closed loop (CL) is used.

Mode 1-0 may indicate an exemplary case in which PMI is not transmitted but WB CQI is transmitted only. In case of Mode 1-0, RI may be transmitted only in the case of Spatial Multiplexing (SM), and one WB CQI denoted by 4 bits may be transmitted. If RI is higher than '1', a CQI for a first codeword may be transmitted. In case of Mode 1-0, Feedback Type 3 and Feedback Type 4 may be multiplexed at different time points within the predetermined reporting period, and then transmitted. The above-mentioned Mode 1-0 transmission scheme may be referred to as Time Division Multiplexing (TDM)-based channel information transmission.

Mode 1-1 may indicate an exemplary case in which a single PMI and a WB CQI are transmitted. In this case, 4-bit WB CQI and 4-bit WB PMI may be transmitted simultaneously with RI transmission. In addition, if RI is higher than '1', 3-bit WB Spatial Differential CQI may be transmitted. In case of transmission of two codewords, the WB spatial differential CQI may indicate a differential value between a WB CQI index for Codeword 1 and a WB CQI index for Codeword 2. These differential values may be assigned to the set {−4, −3, −2, −1, 0, 1, 2, 3}, and each differential value may be assigned to any one of values contained in the set and be represented by 3 bits. In case of Mode 1-1, Feedback Type 2 and Feedback Type 3 may be multiplexed at different time points within the predetermined reporting period, and then transmitted.

Mode 2-0 may indicate that no PMI is transmitted and a CQI of a UE-selected band is transmitted. In this case, RI may be transmitted only in case of an open loop spatial multiplexing (OL SM) only, a WB CQI denoted by 4 bits may be transmitted. In each Bandwidth Part (BP), Best-1 CQI may be transmitted, and Best-1 CQI may be denoted by 4 bits. In addition, an indicator of L bits indicating Best-1 may be further transmitted. If RI is higher than '1', CQI for a first codeword may be transmitted. In case of Mode 2-0, the above-mentioned feedback type 1, feedback type 3, and feedback type 4 may be multiplexed at different time points within a predetermined reporting period, and then transmitted.

Mode 2-1 may indicate an exemplary case in which a single PMI and a CQI of a UE-selected band are transmitted. In this case, WB CQI of 4 bits, WB spatial differential CQI of 3 bits, and WB PMI of 4 bits are transmitted simultaneously with RI

TABLE 3

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

The reporting mode is classified into a wideband (WB) CQI and a subband (SB) CQI according to a CQI feedback type. The reporting mode is classified into a No-PMI and a Single PMI according to transmission or non-transmission of PMI. As can be seen from Table 3, 'NO PMI' may correspond to an exemplary case in which an Open Loop (OL), a Transmit transmission. In addition, a Best-1 CQI of 4 bits and a Best-1 indicator of L bits may be simultaneously transmitted at each bandwidth part (BP). If RI is higher than '1', a Best-1 spatial differential CQI of 3 bits may be transmitted. During transmission of two codewords, a differential value between a Best-1 CQI index of Codeword 1 and a Best-1 CQI index of Codeword 2 may be indicated. In Mode 2-1, the above-mentioned feedback type 1, feedback 2, and feedback type 3 may be multiplexed at different time points within a predetermined reporting period, and then transmitted.

In the UE selected SB CQI reporting mode, the size of BP (Bandwidth Part) subband may be defined by the following table 4.

TABLE 4

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Table 4 shows a bandwidth part (BP) configuration and the subband size of each BP according to the size of a system bandwidth. UE may select a preferred subband within each BP, and calculate a CQI for the corresponding subband.

Figure 10:
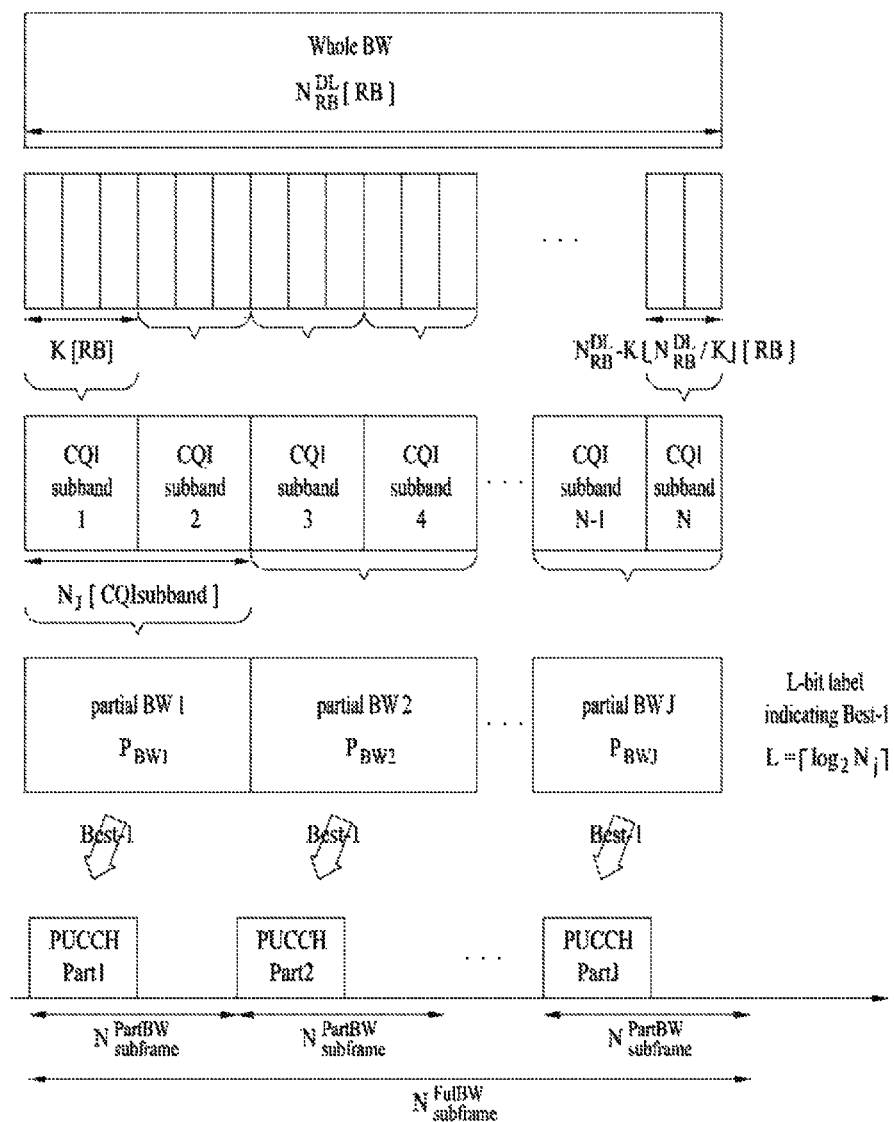
FIG. 10 shows an example of a Channel Quality Indicator (COI) report mode.

FIG. 10 shows an example of a UE selected CQI reporting mode.

$N_{RB}^{DL}$ is the number of RBs of the entire bandwidth. The entire bandwidth may be divided into N CQI subbands (1, 2, 3, . . . , N). One CQI subband may include k RBs defined in Table 4. If the number of RBs of the entire bandwidth is not denoted by an integer multiple of k, the number of RBs contained in the last CQI subband (i.e., the N-th CQI subband) may be determined by the following equation 12.

$$N_{RB}^{DL} - k \cdot \lfloor N_{RB}^{DL}/k \rfloor \quad \text{[Equation 12]}$$

In Equation 12, $\lfloor \ \rfloor$ represents a floor operation, and $\lfloor x \rfloor$ or floor(x) represents a maximum integer not higher than 'x'.

In addition, $N_J$ CQI subbands construct one BP, and the entire bandwidth may be divided into J BPs. UE may calculate a CQI index for one preferred Best-1 CQI subband in contained in one BP, and transmit the calculated CQI index over a PUCCH. In this case, a Best-1 indicator indicating which a Best-1 CQI subband is selected in one BP may also be transmitted. The Best-1 indicator may be composed of L bits, and L may be represented by the following equation 13.

$$L = \lceil \log_2 N_J \rceil \quad \text{[Equation 13]}$$

In Equation 13, $\lceil \ \rceil$ may represent a ceiling operation, and $\lceil x \rceil$ or ceiling(x) may represent a minimum integer not higher than 'x'.

In the above-mentioned UE selected CQI reporting mode, a frequency band for CQI index calculation may be determined. Hereinafter, a CQI transmission period will hereinafter be described in detail.

Each UE may receive information composed of a combination of a transmission period of channel information and an offset from an upper layer through RRC signaling. The UE may transmit channel information to an eNB on the basis of the received channel information transmission period information.

Meanwhile, payload sizes of SB CQI, WB CQI/PMI, RI and WB CQI in association with the PUCCH report type may be represented by the following table 5.

TABLE 5

| PUCCH | | | PUCCH Reporting Modes | | | |
|---|---|---|---|---|---|---|
| Report Type | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
|   |   | RI > 1 | NA | 7 + L | NA | 4 + L |
| 2 | Wideband CQI/PMI | 2 TX Antennas RI = 1 | 6 | 6 | NA | NA |
|   |   | 4 TX Antennas RI = 1 | 8 | 8 | NA | NA |
|   |   | 2 TX Antennas RI > 1 | 8 | 8 | NA | NA |
|   |   | 4 TX Antennas RI > 1 | 11 | 11 | NA | NA |
| 3 | RI | 2-layer spatial multiplexing | 1 | 1 | 1 | 1 |
|   |   | 4-layer spatial multiplexing | 2 | 2 | 2 | 2 |
| 4 | Wideband CQI | RI = 1 or RI > 1 | NA | NA | 4 | 4 |

Aperiodic transmission of CQI, PMI and RI over a PUSCH will hereinafter be described.

In case of the aperiodic reporting, RI and CQI/PMI may be transmitted over the same PUSCH. In case of the aperiodic reporting mode, RI reporting may be effective only for CQI/PMI reporting in the corresponding aperiodic reporting mode. CQI-PMI combinations capable of being supported to all the rank values are shown in the following table 6. Table 6 shows a variety of PUSCH reporting modes, i.e., Modes 1-2, 2-0, 2-2, 3-0, and 3-1.

TABLE 6

| | | PMI Feedback Type | |
|---|---|---|---|
| | | No PMI (OL, TD, single-antenna) | with PMI (CL) |
| PUSCH CQI Feedback Type | Wideband | Wideband (Wideband CQI) | Mode 1-2: Multiple PMI RI $1^{st}$ Wideband CQI (4 bit) $2^{nd}$ Wideband CQI (4 bit) if RI > 1 subband PMIs on each subband |

TABLE 6-continued

| | PMI Feedback Type | |
|---|---|---|
| | No PMI (OL, TD, single-antenna) | with PMI (CL) |
| UE Selected (Subband CQI) | Mode 2-0<br>RI (only for Open-Loop SM)<br>Wideband CQI (4 bit) + Best-M CQI (2 bit)<br>Best-M index<br>when RI > 1, CQI of first codeword | Mode 2-2: Multiple PMI<br>RI<br>$1^{st}$ Wideband CQI (4 bit) + Best-M CQI(2 bit)<br>$2^{nd}$ Wideband CQI (4 bit) + Best-M CQI(2 bit)<br>if RI > 1<br>Wideband PMI + Best-M PMI<br>Best-M index |
| Higher layer-configured<br>(subband CQI) | Mode 3-0<br>RI (only for Open-Loop SM)<br>Wideband CQI (4 bit) + subband CQI (2 bit)<br>when RI > 1, CQI of first codeword | Mode 3-1: Single PMI<br>RI<br>$1^{st}$ Wideband CQI (4 bit) + subband CQI<br>(2 bit)<br>$2^{nd}$ Wideband CQI (4 bit) + subband CQI<br>(2 bit) if RI > 1<br>Wideband PMI |

Mode 1-2 of Table 6 may indicate a WB feedback. In Mode 1-2, a preferred precoding matrix for each subband may be selected from a codebook subset on the assumption of transmission only in the corresponding subband. The UE may report one WB CQI at every codeword, and WB CQI may be calculated on the assumption that data is transmitted on subbands of the entire system bandwidth (Set S) and the corresponding selected precoding matrix is used on each subband. The UE may report the selected PMI for each subband. In this case, the subband size may be given as shown in the following table 7.

TABLE 7

| System Bandwidth<br>$N_{RB}^{DL}$ | Subband Size<br>(k) |
|---|---|
| 6-7 | NA |
| 8-10 | 4 |
| 11-26 | 4 |
| 27-63 | 6 |
| 64-110 | 8 |

In Table 6, Mode 3-0 and Mode 3-1 show a subband feedback configured by a higher layer (also called an upper layer).

In Mode 3-0, the UE may report a WB CQI value calculated on the assumption of data transmission on the set-S (total system bandwidth) subbands. The UE may also report one subband CQI value for each subband. The subband CQI value may be calculated on the assumption of data transmission only at the corresponding subband. Even in the case of RI>1, WB CQI and SB CQI may indicate a channel quality for Codeword 1.

In Mode 3-1, a single precoding matrix may be selected from a codebook subset on the assumption of data transmission on the set-S subbands. The UE may report one SB CQI value for each codeword on each subband. The SB CQI value may be calculated on the assumption of a single precoding matrix used in all the subbands and data transmission on the corresponding subband. The UE may report a WB CQI value for each codeword. The WB CQI value may be calculated on the assumption of a single precoding matrix used in all the subbands and data transmission on the set-S subbands. The UE may report one selected precoding matrix indicator. The SB CQI value for each codeword may be represented by a differential WB CQI value using a 2-bit subband differential CQI offset. That is, the subband differential CQI offset may be defined as a differential value between a SB CQI index and a WB CQI index. The subband differential CQI offset value may be assigned to any one of four values {−2, 0, +1, +2}. In addition, the subband size may be given as shown in the following table 7.

In Table 6, Mode 2-0 and Mode 2-2 illustrate a UE selected subband feedback. Mode 2-0 and Mode 2-2 illustrate reporting of the best-M averages.

In Mode 2-0, the UE may select the set of M preferred subbands (i.e., best-M) from among the entire system bandwidth (set S). The size of one subband may be given as k, and k and M values for each set-S range may be given as shown in the following table 8. The UE may report one CQI value reflecting data transmission only at the best-M subbands (i.e., M selected subbands). This CQI value may indicate a CQI for Codeword 1 even in the case of RI>1. In addition, the UE may report a WB CQI value calculated on the assumption of data transmission on the set-S subbands. The WB CQI value may indicate a CQI for Codeword 1 even in the case of RI>1.

TABLE 8

| System Bandwidth<br>$N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In Mode 2-2, the UE may select the set of M preferred subbands (i.e., best-M) from among the set-S subbands (where the size of one subband is set to k). Simultaneously, one preferred precoding matrix may be selected from among a codebook subset to be used for data transmission on the M selected subbands. The UE may report one CQI value for each codeword on the assumption that data transmission is achieved on M selected subbands and one same selection precoding matrix is used in each of the M subbands. The UE may report an indicator of one precoding matrix selected for the M subbands. In addition, one precoding matrix (i.e., a precoding matrix different from the precoding matrix for the above-mentioned M selected subbands) may be selected from among the codebook subset on the assumption that data transmission is achieved on the set-S subbands. The UE may report a WB CQI, that is calculated on the assumption that data transmission is achieved on the set-S subbands and one precoding matrix is used in all the subbands, at every codeword. The UE may report an indicator of the selected one precoding matrix in association with all the subbands.

In association with the entirety of UE-selected subband feedback modes (Mode 2-0 and Mode 2-2), the UE may report the positions of M selected subbands using a combination index (r), where r may be represented by the following equation 14.

$$r = \sum_{i=0}^{M-1} \binom{N - s_i}{M - i}$$ [Equation 14]

In Equation 14, the set $\{s_i\}_{i=0}^{M-1}$, ($1 \leq s_i \leq N$, $s_i < s_{i+1}$) may include M sorted subband indexes. In Equation 14, $$\binom{x}{y}$$

may indicate an extended binomial coefficient, which is set to $$\binom{x}{y}$$

in case of x≥y and is set to zero of 0 in case of x<y. Therefore, r may have a unique label and may be denoted by $$r \in \left\{0, \ldots, \binom{N}{M} - 1\right\}.$$

In addition, a CQI value for M selected subbands for each codeword may be denoted by a relative differential value in association with a WB CQI. The relative differential valve may be denoted by a differential CQI offset level of 2 bits, and may have a value of 'CQI index−WB CQI index' of M selected subbands. An available differential CQI value may be assigned to any one of four values {+1, +2, +3, +4}.

In addition, the size(k) of supported subband and the M value may be given as shown in Table 8. As shown in Table 8, k or M may be given as a function of a system bandwidth.

A label indicating the position of each of M selected subbands (i.e., best-M subbands) may be denoted by L bits, where L is denoted by $$L = \left\lceil \log_2 \binom{N}{M} \right\rceil.$$

Channel Status Information Feedback for Multi-Carrier Transmission

As described above, in case of the aperiodic CQI-only transmission in which a UE a periodically transmits only a CQI, the legacy wireless communication system (e.g., 3GPP LTE Release 8 or 9) capable of supporting downlink transmission through a maximum of 4 transmission (Tx) antennas on a single carrier, defines that CQI/PMI/RI is QPSK-modulated and is transmitted within four physical resource blocks (4 PRBs).

Meanwhile, the improved format of the 3GPP LTE Release 8 or 9 system may be referred to as a 3GPP LTE Release-10 system (also called a 3GPP LTE-A system), may transmit data over a maximum of 8 Tx antennas or may use multi-carrier technology. As described above, if the number of Tx antennas and the number of carriers for use in the transmission end are increased, the payload size of channel status information (CQI/PMI/RI) to be reported by a reception end is increased, so that it is necessary to provide enough space to transmit channel status information (CQI/PMI/RI). In order to increase capacity for reporting channel status information (CSI), spatial multiplexing (SM) may be used, a higher modulation order (e.g., 16QAM [16 Quadrature Amplitude Modulation]) may be used, or the number ($N_{PRB}$) of PRBs assigned for feedback transmission may be higher than the number (e.g., 4 RBs) of legacy PRBs.

In association with the above-mentioned description, provided that a transmission rank is set to 1, this means that CQI-only transmission is supported. A method of using either a higher modulation order or a higher $N_{PRB}$ will hereinafter be described in detail.

CQI-Only Transmission in Single Carrier Configuration

First of all, a method for increasing capacity to be used for CSI reporting on the assumption that multi-carrier (or carrier aggregation) technology is not used (i.e., a single carrier is established) will hereinafter be described in detail.

In order to support higher order MIMO transmission, the 3GPP LTE Release-10 system supporting the extended antenna configuration may use a feedback codebook having finer granularity. Accordingly, although better channel status information (CSI) for closed loop MIMO transmission can be provided, a larger-sized codebook needs to indicate a channel status for 8 Tx antenna transmission. For example, each of Rank-1 codebook and Rank-2 codebook for 8 Tx antenna transmission may include 256 elements, and is 16 times larger than a codebook for 4 Tx antenna transmission.

On the other hand, a codebook to be used for CSI reporting in a system including the extended antenna configuration may determine a codebook element using two different PMIs. For example, from among two PMIs, a first PMI (which may be denoted by W1 or i1) may have long-term/Wideband attributes, and a second PMI (which may be denoted by W2 or i2) may have short-term/subband attributes. When using a dual PMI reporting structure as described above, feedback overhead is less increased even in a high-overhead PUSCH reporting mode in the same manner as in a PUSCH reporting mode 1-2 and a PUSCH reporting mode 3-1. Table 9 shows feedback overhead requested when the PUSCH reporting mode 1-2 or 3-1 is applied in case of 4 Tx antenna transmission or 8 Tx antenna transmission.

TABLE 9

| | | Mode 1-2 | | Mode 3-1 | |
|---|---|---|---|---|---|
| | | 4Tx | 8Tx | 4Tx | 8Tx |
| Rank-1 | CQI | 4 | 4 | 4 + 2 × N | 4 + 2 × N |
| | PMI | 4 × N | 4 + 4 × N | 4 | 4 + 4 |
| | Overhead (5, 10, 20 MHz) | 32, 40, 56 | 36, 44, 60 | 22, 26, 44 | 26, 30, 48 |
| Rank-2 | CQI | 4 × 2 | 4 × 2 | (4 + 2 × N) × 2 | (4 + 2 × N) × 2 |
| | PMI | 4 × N | 4 + 4 × N | 4 | 4 + 4 |
| | Overhead (5, 10, 20 MHz) | 36, 44, 60 | 40, 48, 64 | 40, 48, 84 | 44, 52, 88 |

In Table 9, N is the number of subbands. In a 5 MHz band, N is set to 7. In a 10 MHz band, N is set to 9. In a 2-MHz band, N is set to 13.

The 8 Tx antenna transmission has a differential codebook structure in which a dual PMI (i.e., W1 and W2) is reported. Thus, in case of the PUSCH reporting mode 1-2 or 3-1, the 8 Tx antenna transmission may further requires 4 bits as compared to 4 Tx antenna transmission for use in the 3GPP LTE Release-8 system. In the 3GPP LTE Release-10 system, feedback overhead is less increased in case of one carrier (or CC), so that it is preferable that new control signaling is not defined to implement scheduling for increasing feedback capacity. Considering the above-mentioned situation, it is preferable that the extended antenna configuration system may use the same scheme (which uses a QPSK modulation scheme to report a channel status and uses a maximum of 4 PRBs only) as in the legacy 3GPP LTE Release-8 system. Accordingly, if a single carrier is established, the extended antenna configuration system (e.g., 3GPP LTE Release-10 system) may also generate/transmit a CSI using the QPSK modulation scheme within a maximum of 4 PRBs in association with CQI-only PUSCH transmission.

CQI-Only Transmission in Multi-carrier Configuration

Although multiple carriers (multi-carrier) may be used even in uplink transmission as described above, aperiodic CSI reporting may be performed only in one carrier (e.g., UL P-cell) as necessary. Accordingly, when the aperiodic CSI reporting for multiple DL CCs is transmitted through a single UL CCs, a PUSCH space for carrying CSIs of such multiple DL CCs may be insufficient.

Table 10 shows a variety of effective coding rates for CQI/PMI reporting in consideration of an information bit size, a modulation order and the number of assigned REs.

In Table 10, Case 2 shows an exemplary case in which RI and SRS are reported together with CQI/PMI. In Case 2, $RI^2$ means that a maximum number of REs are used for RI transmission (i.e., all REs of an SC-FDMA symbol are used for RI).

In Table 10, Case 3 shows an exemplary case in which $RI^2$, SRS and ACK/NACK$^3$ ($A/N^3$) are reported together with CQI/PMI. In Case 3, $RI^2$ means that a maximum number of REs are used for RI transmission (i.e., all REs of an SC-FDMA symbol are used for RI), and $A/N^3$ means that a maximum number of REs are used to A/N transmission (i.e., all REs of SC-FDMA symbol are used for A/N).

In Table 10, ▨ denotes QPSK 1/20 to 1/5, ▨ denotes QPSK 1/5 to 1/3, ▨ denotes QPSK 1/3 to 1/2, and ▨ denotes 16QAM 1/5 to 1/2.

In order to calculate the effective coding rate for CQI/PMI reporting, in association with a maximum payload size of Rank-2 feedback information for 8 Tx antenna transmission, it is assumed that 88 bits are used to report a CQI/PMI to each DL CC and 8 bits are used to perform CRC as shown in Table 9.

In case of a single DL CC, Case 1 has an effective coding rate of 0.085 in the CQI/PMI reporting, Case 2 has an effective coding rate of 0.143 in the CQI/PMI reporting. In addition, since RI, SRS and A/N are multiplexed together with CQI/PMI, the effective coding rate is still less than 0.5 even in the worst case as in Case 3 having the smallest number of REs

TABLE 10

| | | # of avaliable REs for CQI/PMI | | | | | | | | |
|---|---|---|---|---|---|---|---|---|---|---|
| | | $RI^1$ is reported together with CQI/PMI (Case 1) | | | $RI^2$ and SRS are reported together with CQI/PMI (Case 2) | | | $RI^2$, SRS and $A/N^3$ are reported together with CQI/PMI (Case 3) | | |
| | | 4 RBs | 6 RBs | 8 RBs | 4 RBs | 6 RBs | 8 RBs | 4 RBs | 6 RBs | 8 RBs |
| Information bit size | | 568 REs | 852 REs | 1136 REs | 336 REs | 504 REs | 672 REs | 144 REs | 216 REs | 288 REs |
| 1 DL CC (88 + 8 bits) | QPSK | 0.085 | | | 0.143 | | | 0.333 | 0.222 | 0.167 |
| | 16 QAM | — | — | — | — | — | — | — | — | — |
| 2 DL CCs (172 + 8 bits) | QPSK | 0.158 | | | 0.268 | 0.179 | 0.134 | 0.625 | 0.417 | 0.313 |
| | 16 QAM | | | | | | | 0.313 | 0.208 | 0.156 |
| 3 DL CCs (264 + 8 bits) | QPSK | 0.239 | 0.160 | | 0.405 | 0.270 | 0.202 | | 0.630 | 0.472 |
| | 16 QAM | | | | | | | 0.472 | 0.315 | 0.236 |
| 4 DL CCs (352 + 8 bits) | QPSK | 0.317 | 0.211 | 0.158 | 0.536 | 0.357 | 0.268 | | | 0.625 |
| | 16 QAM | | | | 0.268 | 0.179 | 0.134 | 0.625 | 0.417 | 0.313 |
| 5 DL CCs (440 + 8 bits) | QPSK | 0.394 | 0.263 | 0.197 | 0.667 | 0.444 | 0.333 | | | |
| | 16 QAM | | | | 0.333 | 0.222 | 0.167 | 0.778 | 0.519 | 0.389 |

In Table 10, Case 1 shows an exemplary case in which RI is reported together with CQI/PMI. In Case 1, $RI^1$ means that a minimum number of REs are used for RI transmission (i.e., 8 REs are used for 4 RBs, 12 REs are used for 6 RBs, and 16 REs are used for 8 RBs).

available for CQI/PMI. As a result, assuming that one DL CC is established, it should be noted that CQI/PMI reporting is still highly reliable although a maximum number of PRBs and a modulation order for CQI-only transmission are not increased.

In case of the CQI/PMI reporting for multiple DL CCs, the effective coding rate for the CQI/PMI reporting is gradually increased in proportion to the number of DL CCs, because feedback overhead is also gradually increased. In addition, if RI, SRS and A/N are multiplexed along with CQI/PMI, the effective coding rate may be further increased (i.e., as shown in ▓ in Table 10, the effective coding rate is gradually increased in the order of 0.625→0.778→0.519.). Thus, in order to maintain the reliability, when applying CQI/PMI reporting to multiple DL CCs, a maximum number of RBs used for CSI feedback needs to be increased and a modulation order also needs to be increased.

In summary, in the case of reporting the CQI/PMI reporting for a single DL CC, although parameters (i.e., $N_{PRB} \leq 4$ and QPSK) defined in the legacy 3GPP LTE Release-8 system are used, the sufficient coding rate and capacity for reporting CQI/PMI feedback information may be provided. In the meantime, in the case of reporting the CQI/PMI reporting for multiple DL CCs, many more PRBs (e.g., $N_{PRB} \leq 8$) and a higher modulation order (e.g., 16QAM) are needed to provide the sufficient coding rate and capacity.

Therefore, according to one embodiment of the present invention, if multiple DL CCs are established (i.e., if two or more DL CCs are established), a larger bandwidth (a maximum of 8 RBs) and a higher-order modulation method (a maximum of 16-QAM) may be used to implement CQI-only PUSCH transmission for the multiple DL CCs. Accordingly, the reliability of channel status information of multiple DL CCs can be increased, and effective and correct multi-carrier and MIMO transmission can be performed.

Method for Indicating Cqi-Only PUSCH Transmission

A method for indicating CQI-only PUSCH transmission using the above-mentioned uplink (UL) resource and modulation scheme (i.e., a method for triggering CQI-only PUSCH transmission) will hereinafter be described in detail.

If multiple DL cells (i.e., multiple DL CCs) for a certain UE are established, a 2-bit CQI request field for indicating aperiodic CQI request triggering or a 2-bit CSI request field may be defined in a PDCCH DCI format (e.g., a DCI format 0 or DCI format 4 for UL scheduling).

As shown in Table 11, if '10' or '11' is indicated in the 2-bit CSI request field, aperiodic CSI transmission for the set of CCs or cells may be triggered. In this case, the set of cells may be established by an upper layer (e.g., RRC, layer), one cell (or one CC) may construct one set, or two or more cells (or two or more CCs) may construct one set. That is, if '10' or '11' is indicated in the CSI request field, aperiodic CSI transmission for a single CC or cell (or a single serving cell) may be triggered according to higher layer configuration, or aperiodic CSI transmission for multiple CCs or cells (or multiple serving cells) may be triggered according to higher layer configuration.

On the other hand, as shown in the following table 11, if '01' is indicated in the 2-bit CSI request field, aperiodic CSI transmission for a single CC or cell (or a single serving cell) may be explicitly triggered.

TABLE 11

| Value of CSI request field | Description |
| --- | --- |
| '00' | No aperiodic CSI report is triggered |
| '01' | Aperiodic CSI report triggered for serving cell $^c$ |
| '10' | Aperiodic CSI report is triggered for a 1st set of serving cells configured by higher layers |
| '11' | Aperiodic CSI report is triggered for a 2nd set of serving cells configured by higher layers |

Preferably, a larger bandwidth and higher-order modulation scheme may be used to more effectively support multiple carriers (i.e., multiple CCs or cells), so that a larger bandwidth and 16-QAM modulation method may be used to perform CSI report triggering for multiple carriers.

TABLE 12

| Value of CSI request field | $N_{PRB} \leq X$ | Modulation format |
| --- | --- | --- |
| 01: Triggering CSI reporting for single carrier | X = 4 | $I_{MCS}$ = 29:QPSK |
| 10, 11: Triggering CSI reporting for multi-carrier | X = M | $I_{MCS}$ = 29:QPSK<br>$I_{MCS}$ = 31:16QAM |

In accordance with an embodiment of the present invention, in case of aperiodic CQI-only PUSCH transmission for a single carrier as shown in Table 12, $I_{MCS}$ is set to 29 ($I_{MCS}$=29), $N_{PRB}$ is identical to or less than 4 ($N_{PRB} \leq 4$), and a CQI request field is set to 01 (CQI request field=01), so that the aperiodic CQI-only PUSCH transmission may be triggered. In case of aperiodic CQI-only PUSCH transmission for multiple carriers (i.e., multiple CCs or cells), $I_{MCS}$ is set to 29 or 31 ($I_{MCS}$=29 or 31), $N_{PRB}$ is identical to or less than M ($N_{PRB} \leq M$, where M>4, for example, M may be set to 6 or 8), and a CQI request field is set to 10 or 11 (CQI request field=10 or 11), so that the aperiodic CQI-only PUSCH transmission for multiple carriers may be triggered.

In accordance with embodiments of the present invention, provided that $I_{MCS}$=29 is established to trigger CQI-only PUSCH transmission, this means that an index of an indicator ($I_{MCS}$) of a modulation and coding scheme (MCS) for an enabled transport block (TB) is set to 29. In association with the above-mentioned description, while an $I_{MCS}$ value for one TB is indicated in a DCI format 0 from among a UL grant DCI format (also called a UL DCI format) including a CSI request field, an $I_{MCS}$ value for each of two TBs may be indicated in a DCI format 4. If $I_{MCS}$ is set to a specific value (for example, 0 or 28), the DCI format 4 may indicate a disabled status of the corresponding TB. That is, provided that an $I_{MCS}$ value is set to 29 ($I_{MCS}$=29), this means that the enabled TB is configured. In addition, in case of the CQI-only PUSCH transmission, an $I_{MCS}$ value for allowing the remaining TBs to be disabled may be indicated except for that $I_{MCS}$=29 is established for one enabled TB so as to trigger CQI-only PUSCH transmission. Therefore, if it is assumed that $I_{MCS}$=29 is established in a DCI format so as to trigger CQI-only PUSCH transmission according to an embodiment of the present invention, this means that only one TB is enabled in the corresponding DCI format.

Therefore, in the case where only one TB is enabled in a UL grant DCI format and a value of a CQI request field and each of $I_{MCS}$ and $N_{PRB}$ values for the enabled TB has a specific value, CQI-only PUSCH transmission may be triggered. Accordingly, examples for triggering CQI-only PUSCH transmission are as follows.

For example, in the case where only one TB is enabled in a DCI format and a CQI request field is 1 bit long, a CQI request field has a value of 1 and an $I_{MCS}$ value for the enabled TB is set to 29 ($I_{MCS}$=29). In addition, if $N_{PRB}$ is identical to or less than 4 (i.e., $N_{PRB} \leq 4$), this means that CQI-only PUSCH transmission is indicated to be executed (i.e., CQI-only PUSCH transmission is triggered).

For example, in the case where only one TB is enabled in a DCI format and a CQI request field is 2 bits long, the CQI request field is set to 01, 10 or 11. In the case where an $I_{MCS}$ value for the enabled TB is set to 29 ($I_{MCS}$=29), $N_{PRB}$ is identical to or less than 4 ($N_{PRB} \leq M$, where M>4, for example, M may be set to 6, 8, or any value of more than 8), the execution of CQI-only PUSCH transmission for multiple DL cells may be indicated (or triggered).

In more detail, in the case where only one TB is enabled in a DCI format and a 2-bit CQI request field is set to 01, 10, or 11, an $I_{MCS}$ value for the enabled TB is set to 29 ($I_{MCS}$=29), CQI-only PUSCH reporting for a single DL cell or CQI-only PUSCH reporting for multiple DL cells may be carried out in response to an $N_{PRB}$ value (i.e., an M value in the above example) acting as a reference value. For example, if an M value is set to 4, CQI-only PUSCH reporting for a single DL cell may be triggered. If an M value is higher than 4 (e.g., M=6), CQI-only PUSCH reporting for multiple DL cells may be carried out.

In the above-mentioned examples, enabling only one TB in a DCI format may indicate that the corresponding one TB is enabled in a DCI format 0 indicating an $I_{MCS}$ value for one TB. In case of a DCI format 4 indicating an $I_{MCS}$ value of two TBs, the enabling of only one TB may indicate that only one TB is enabled. In order to support the increased payload size of CSI feedback information in a system supporting the extended antenna configuration (e.g., 3GPP LTE Release-10 system), a bandwidth for CSI reporting may be increased in size and a higher-order modulation scheme may be used. In addition, a method for triggering CQI-only PUSCH transmission in consideration of the above-mentioned characteristics may be applied to an embodiment of the present invention.

In summary, a maximum of 4 PRBs and a QPSK modulation scheme may be applied to a single DL cell in the same manner as in the legacy CQI-only PUSCH transmission, and many more PRBs (e.g., four or more PRBs) or a higher-order modulation scheme (e.g., 16-QAM) may be used for CQI-only PUSCH transmission.

Detailed embodiments of a transmission resource configuration, modulation order configuration, and triggering scheme for CQI-only PUSCH transmission will hereinafter be described in detail.

Embodiment 1

It is assumed that a 2-bit CSI request field is used in a PDCCH DCI format (e.g., DCI format 4) for UL scheduling, and a periodic CSI request for a single carrier or cell (or a single serving cell) is triggered. For example, in accordance with the first embodiment, a 2-bit CSI request field shown in Table 11 may be set to 01. Alternatively, a 2-bit CSI request field is set to 10 or 11 and a single carrier (or a single serving cell) may be indicated by higher layer configuration. In this case, when triggering CQI-only PUSCH transmission, if $N_{PRB}$ is identical to or less than 4 ($N_{PRB} \leq 4$), CSI reporting for a single DL cell may be used.

In addition, it is assumed that a 2-bit CSI request field is used in a PDCCH DCI format (e.g., a DCI format 4) for UL scheduling, and the aperiodic CSI request for multiple carriers or cells (or multiple serving cells) is triggered. For example, a 2-bit CSI request field shown in Table 11 may be set to 10 or 11, and at the same time multiple carriers or cells (or multiple serving cells) may be indicated by higher layer configuration. In this case, if $N_{PRB}$ is identical to or less than X ($N_{PRB} \leq X$), CSI reporting for multiple DL cells may be used. In this case, X may be defined as a value higher than 4 (e.g., X=6, 8 or any value of more than 8) irrespective of the number of DL cells. However, it should be noted that the above-mentioned X value is disclosed only for illustrative purposes, and an arbitrary value (e.g., 20) higher than 4 may be used.

For example, assuming that a 2-bit CQI request field for use in a DCI format may be set to 01, 10, or 11, and aperiodic CSI reporting for a single serving cell is triggered, an $I_{MCS}$ value for the enable TB is set to 29 ($I_{MCS}$=29), if $N_{PRB}$ is identical to or less than 4 ($N_{PRB} \leq 4$), CQI-only PUSCH reporting for a single serving cell may be triggered. In addition, in the case where a 2-bit CQI request field in a DCI format is set to 10 or 11 and aperiodic CSI reporting for multiple serving cells is triggered, if $N_{PRB}$ is identical to or less than 20 ($N_{PRB} \leq 20$), CQI-only PUSCH reporting for multiple serving cells may be triggered.

Embodiment 2

A second embodiment relates to a modulation method for use in CQI-only PUSCH transmission. In accordance with the modulation method of the second embodiment, QPSK may be used in case of CSI reporting for a single DL cell, and QPSK and 16-QAM may be used in case of CSI reporting for multiple DL cells.

Embodiment 3

In accordance with a modulation method for use in CQI-only PUSCH transmission on the assumption of the first embodiment, QPSK may be applied not only to the CSI reporting for a single DL cell but also to the CSI reporting for multiple DL cells.

Embodiment 4

In accordance with a modulation method for use in CQI-only PUSCH transmission on the assumption of the first embodiment 1, QPSK may be applied to the CSI reporting for a single DL cell, and QPSK and 16-QAM may be applied to the CSI reporting for multiple DL cells.

Embodiment 5

In association with the above-mentioned first to fourth embodiments, a signaling method for triggering CQI-only PUSCH transmission will hereinafter be described in detail.

That is, state configurations of the CSI reporting field defined for multiple carriers or cells may be constructed as shown in the following table 13 to 15 according to the above-mentioned schemes shown in the first to fourth embodiments.

TABLE 13

| Value of CSI request field | $N_{PRB} \leq X$ | Modulation format |
|---|---|---|
| 01: Triggering CSI reporting for single carrier | X = 4 | $I_{MCS}$ = 29:QPSK |
| 10, 11: Triggering CSI reporting for multi-carrier | X = M | $I_{MCS}$ = 29:QPSK |

In Table 13, M may be higher than 4 RBs (M>4RBs). For example, M may be set to 6 RBs or 8 RBs. However, the However, it should be noted that the above-mentioned M value is disclosed only for illustrative purposes, and an arbitrary value higher than 4 may be used.

TABLE 14

| Value of CSI request field | $N_{PRB} \leq X$ | Modulation format |
|---|---|---|
| 01: Triggering CSI reporting for single carrier | X = 4 | $I_{MCS}$ = 29:QPSK |
| 10, 11: Triggering CSI reporting for multi-carrier | X = M | $I_{MCS}$ = 29:QPSK<br>$I_{MCS}$ = 30 or 31: 16QAM |

In Table 14, M may be higher than 4 RBs (M>4RBs). For example, M may be set to 6 RBs or 8 RBs. However, it should noted that the M value is disclosed only for illustrative purposes and is not limited thereto, an arbitrary value higher than 4 may be applied to the M value as necessary.

TABLE 15

| Value of CSI request field | $N_{PRB} \leq X$ | Modulation format |
|---|---|---|
| 01: Triggering CSI reporting for single carrier | X = 4 | $I_{MCS}$ = 29:QPSK |
| 10: Triggering CSI reporting for multi-carrier | X = $M_1$ | $I_{MCS}$ = 29:QPSK |
| 11: Triggering CSI reporting for multi-carrier | X = $M_2$ | $I_{MCS}$ = 29:QPSK |

In Table 15, $M_1$ may be set to $M_1$>4RB, and $M_2$ may be set to $M_2$>4RB. In this case, $M_1$ and $M_2$ may be different from each other, for example, $M_1$=6RB and $M_2$=8RB. In this case, it should be noted that 6RB or 8RB is disclosed only for illustrative purposes and the scope or spirit of the present invention is not limited thereto. That is, an arbitrary value higher than 4 may be applied to each of $M_1$ and $M_2$.

On the other hand, a DCI format may be defined in each of a UE-specific C-RNTI search space and a common C-RNTI search space. The UE-specific C-RNTI search space is a space in which a UE has to search for a DCI format according to a transmission mode, and the common C-RNTI search space is a space in which a UE always has to search for a DCI format.

Embodiments of the present invention can be applied to a 1-bit or 2-bit CSI request field for use in DCI formats 0 and 4 defined in the UE-specific C-RNTI search space. Alternatively, the embodiments of the present invention may be applied to the 1-bit CSI request field for use in DCI format 0 defined in the common C-RNTI search space.

Figure 11:
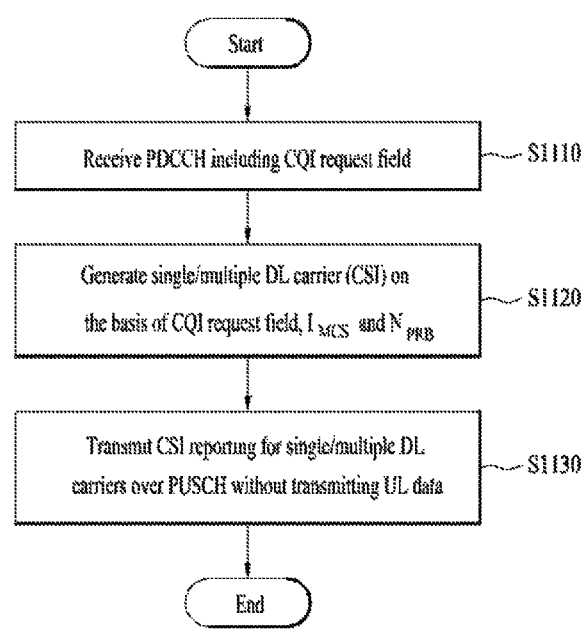
FIG. 11 is a flowchart illustrating a method for transmitting channel status information according to an embodiment of the present invention.

FIG. 11 is a flowchart illustrating a method for transmitting channel status information according to an embodiment of the present invention. A method for indicating channel status information transmission and a method for transmitting channel status information according to an embodiment of the present invention will hereinafter be described with reference to FIG. 11.

Referring to FIG. 11, a UE may receive a PDCCH of a DCI format including a CQI request field from a base station (or eNB) at step S1110. In addition, an MCS index ($I_{MCS}$) may be indicated by a PDCCH, and the number ($N_{PRB}$) of RBs available to aperiodic CSI reporting may be indicated. $I_{MCS}$ may be a value related to an enabled transport block (TB).

In step S1120, a UE determines whether CSI reporting for a single DL carrier (single DL cell) is requested on the basis of information received from the eNB, or determines whether CSI reporting for multiple DL carriers (multiple DL cells) is requested, so that a CSI for single/multiple DL carrier(s) may be generated.

For example, a CQI request field indicated by a PDCCH of the step S1110 may have a value indicating aperiodic CSI reporting. For example, a CQI request field for use in a UL grant DCI format (DCI format 0 or 4) may be 1 bit or 2 bits long. Assuming that the 1-bit CQI request field is set to 1, if a 2-bit CQI request field is set to 01, 10 or 11, aperiodic CSI reporting may be indicated. In addition, in the case where an $I_{MCS}$ value indicated by a PDCCH is set to 29 and $N_{PRB}$ is identical to or less than 4 ($N_{PRB} \leq 4$), the UE may recognize that CSI reporting for a single DL carrier or cell is indicated. In addition, provided that an $I_{MCS}$ value indicated by a PDCCH is set to 29 and $N_{PRB}$ is identical to or less than M ($N_{PRB} \leq M$), it can be recognized that the CSI reporting for a single DL carrier or cell is indicated (where M>4).

In addition, when a UE generates a CSI, channel status information (CSI) for a single DL carrier or cell may be modulated according to the QPSK scheme, and channel status information (CSI) for multiple DL carriers or cells may be modulated according to the QPSK or 16QAM scheme.

In step S1130, a UE may transmit the CSI reporting for a single DL cell or the CSI reporting for multiple DL cells to an eNB over a PUSCH without transmitting UL data. For example, if a UE in which multiple DL cells are established by a higher layer receives control information from an eNB, the corresponding UE generates a CSI for multiple DL cells and transmits a PUSCH other than UL data over the eNB. In case of the above-mentioned control information received from the eNB, a CSI request field is set to 10, an $I_{MCS}$ value is set to 29 ($I_{MCS}$=29), and $N_{PRB}$ is denoted by 4<$N_{PRB} \leq$M.

In association with the CSI transmission indication method and the CSI transmission method as shown in FIG. 11, the contents described in the above-mentioned embodiments may be used independently of each other or two or more embodiments may be simultaneously applied, and the same parts may herein be omitted for convenience and clarity of description.

In addition, the principles of the present invention may also be applied to the CSI transmission indication method and the CSI transmission method according to the present invention in association with not only MIMO transmission between an eNB and a RN (for use in in a backhaul uplink and a backhaul downlink) but also MIMO transmission between an RN and a UE (for use in an access uplink and an access downlink).

FIG. 12 is a block diagram of an eNB apparatus and a UE apparatus according to an embodiment of the present invention.

Referring to FIG. 12, an eNB apparatus 1210 may include a reception (Rx) module 1211, a transmission (Tx) module 1212, a processor 1213, a memory 1214, and a plurality of antennas 1215. The plurality of antennas 1215 may be contained in the eNB apparatus supporting MIMO transmission and reception. The reception (Rx) module 1211 may receive a variety of signals, data and information on an uplink starting from the UE. The transmission (Tx) module 1212 may transmit a variety of signals, data and information on a downlink for the UE. The processor 1213 may provide overall control to the eNB apparatus 1210.

The eNB apparatus 1210 according to one embodiment of the present invention may be constructed to indicate channel status information (CSI) transmission in a wireless communication system supporting multiple carriers. The processor 1213 of the eNB apparatus 1210 may enable the Tx module 1212 to transmit a DCI including a CQI request field to a UE over a PDCCH. In addition, the processor 1213 may enable the Rx module 1211 to receive the CSI reporting for a single DL carrier or multiple DL carriers from a UE over a PUSCH without receiving UL data. In this case, if channel status information (CSI) for a single DL carrier is reported, the number ($N_{PRB}$) of RBs established for the CSI reporting may be identical to or less than X ($N_{PRB} \leq X$). If channel status information (CSI) for multiple DL carriers is reported, $N_{PRB}$ may be less than M (where M>X). In this case, X may be set to 4 (X=4).

Besides, the processor 1213 of the eNB apparatus 1210 processes information received at the eNB apparatus 1210 and transmission information. The memory 1214 may store the processed information for a predetermined time. The memory 1214 may be replaced with a component such as a buffer (not shown).

Referring to FIG. 12, a UE apparatus 1220 may include a reception (Rx) module 1221, a transmission (Tx) module 1222, a processor 1223, a memory 1224, and a plurality of antennas 1225. The plurality of antennas 1225 may be contained in the UE apparatus supporting MIMO transmission and reception. The reception (Rx) module 1221 may receive a variety of signals, data and information on a downlink starting from the eNB. The transmission (Tx) module 1222 may transmit a variety of signals, data and information on an uplink for the eNB. The processor 1223 may provide overall control to the UE apparatus 1220.

The UE apparatus 1220 according to one embodiment of the present invention may be constructed to indicate channel status information (CSI) transmission in a wireless communication system supporting multiple carriers. The processor 1223 of the UE apparatus 1220 may enable the Rx module 1221 to receive a DCI including a CQI request field to from the eNB over a PDCCH. In addition, the processor 1223 may enable the Tx module 1222 to transmit the CSI reporting for a single DL carrier or multiple DL carriers to the eNB over a PUSCH without transmitting UL data. In this case, if channel status information (CSI) for a single DL carrier is reported, the number ($N_{PRB}$) of RBs established for the CSI reporting may be identical to or less than X ($N_{PRB} \leq X$). If channel status information (CSI) for multiple DL carriers is reported, $N_{PRB}$ may be less than M (where M>X). In this case, X may be set to 4 (X=4).

Besides, the processor 1223 of the UE apparatus 1220 processes information received at the UE apparatus 1220 and transmission information. The memory 1224 may store the processed information for a predetermined time. The memory 1224 may be replaced with a component such as a buffer (not shown).

In association with the CSI transmission indication method and the CSI transmission method as shown in FIG. 11, the contents described in the above-mentioned embodiments may be used independently of each other or two or more embodiments may be simultaneously applied, and the same parts may herein be omitted for convenience and clarity of description.

The specific configurations of the above eNB and UE apparatuses may be implemented such that the various embodiments of the present invention are performed independently or two or more embodiments of the present invention are performed simultaneously. Redundant matters will not be described herein for clarity.

The eNB apparatus 1210 shown in FIG. 12 may also be applied to a relay node (RN) acting as a DL transmission entity or UL reception entity, and the UE apparatus 1220 shown in FIG. 12 may also be applied to a relay node (RN) acting as a DL reception entity or UL transmission entity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

As apparent from the above description, exemplary embodiments of the present invention have the following effects. The embodiments of the present invention provide a method and apparatus for feeding back effective channel status information. In more detail, when channel status information for downlink multi-carrier transmission is aperiodically fed back over an uplink data channel, the embodiments of the present invention provides a method for extending capacity required for reporting channel status information, a method for indicating feedback of channel status information, etc.

The embodiments of the present invention are applicable to a variety of mobile communication systems. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for indicating channel status information (CSI) transmission in a wireless communication system supporting multiple carriers, the method comprising: transmitting downlink control information (DCI) including a CSI request field to a user equipment (UE) over a physical downlink control channel (PDCCH), the CSI request field having a length of 2 bits; and receiving CSI reporting of a single downlink carrier or CSI reporting of multiple downlink carriers from the UE over a physical uplink shared channel (PUSCH) without receiving uplink data, wherein, when the CSI request field has a value of '01', a number (NPRB) of resource blocks (RBs) established for the CSI reporting is identical to or less than X (NPRB≤X), and wherein, when the CSI request field has a value of '10' or '11', the NPRB established for the CSI reporting is identical to or less than M (where M>X), wherein the CSI request field value of '01' further indicates that the CSI reporting is CSI reporting for a single downlink carrier, and the CSI request field value of '10' or '11' further indicates that the CSI reporting is CSI reporting for multiple downlink carriers, and wherein only a QPSK (Quadrature Phase Shift Keying) modulation scheme is applied to the CSI reporting for the single downlink carrier and the CSI reporting for the multiple downlink carriers.

2. The method according to claim 1, wherein the CSI request field is assigned a specific value indicating aperiodic CSI reporting.

3. The method according to claim 1, wherein the DCI further includes a modulation and coding scheme (MCS) index ($I_{MCS}$), where $I_{MCS}$ is set to 29.

4. The method according to claim 3, wherein the $I_{MCS}$ value indicates a value regarding an enabled transport block (TB).

5. The method according to claim 1, wherein the X value is set to 4.

6. The method according to claim 1, wherein the CSI includes at least one of a channel quality indicator (CQI), a precoding matrix index (PMI), and a rank indicator (RI).

7. A method for indicating channel status information (CSI) transmission in a wireless communication system supporting multiple carriers, the method comprising: receiving downlink control information (DCI) including a CSI request field from a base station (BS) over a physical downlink control channel (PDCCH), the CSI request field having a length of 2 bits; and transmitting CSI reporting of a single downlink carrier or CSI reporting of multiple downlink carriers to the BS over a physical uplink shared channel (PUSCH) without transmitting uplink data, wherein, when the CSI request field has a value of '01', a number (NPRB) of resource blocks (RBs) established for the CSI reporting is identical to or less than X (NPRB≤X), and wherein, when the CSI request field has a value '10' or '11', the NPRB established for the CSI reporting is identical to or less than M (where M>X), wherein the CSI request field value of '01' further indicates that the CSI reporting is CSI reporting for a single downlink carrier, and the CSI request field value of '10' or '11' further indicates that the CSI reporting is CSI reporting for multiple downlink carriers, and wherein only a QPSK (Quadrature Phase Shift Keying) modulation scheme is applied to the CSI reporting for the single downlink carrier and the CSI reporting for the multiple downlink carriers.

8. The method according to claim 7, wherein the CSI request field is assigned a specific value indicating aperiodic CSI reporting.

9. The method according to claim 7, wherein the DCI further includes a modulation and coding scheme (MCS) index ($I_{MCS}$), where $I_{MCS}$ is set to 29.

10. The method according to claim 9, wherein the $I_{MCS}$ value indicates a value regarding an enabled transport block (TB).

11. The method according to claim 7, wherein the X value is set to 4.

12. The method according to claim 7, wherein the CSI includes at least one of a channel quality indicator (CQI), a precoding matrix index (PMI), and a rank indicator (RI).

13. A base station (BS) for indicating channel status information (CSI) transmission in a wireless communication system supporting multiple carriers comprising: a receiver configured to receive an uplink signal from a user equipment (UE); a transmitter configured to transmit a downlink signal to the UE; and a processor operatively connected to the transmitter and the receiver, the processor configured to transmit, through the transmitter, downlink control information (DCI) including a CSI request field to the UE over a physical downlink control channel (PDCCH), the CSI request field having a length of 2 bits, and receive, through the receiver, CSI reporting of a single downlink carrier or CSI reporting of multiple downlink carriers from the UE over a physical uplink shared channel (PUSCH) without receiving uplink data, wherein, when the CSI request field has a value of '01', a number (NPRB) of resource blocks (RBs) established for the CSI reporting is identical to or less than X (NPRB≤X), and wherein, when the CSI request field has a value '10' or '11', the NPRB established for the CSI reporting is identical to or less than M (where M>X), wherein the CSI request field value of '01' further indicates that the CSI reporting is CSI reporting for a single downlink carrier, and the CSI request field value of '10' or '11' further indicates that the CSI reporting is CSI reporting for multiple downlink carriers, and wherein only a QPSK (Quadrature Phase Shift Keying) modulation scheme is applied to the CSI reporting for the single downlink carrier and the CSI reporting for the multiple downlink carriers.

14. A user equipment (UE) for transmitting channel status information (CSI) in a wireless communication system supporting multiple carriers comprising: a receiver for receiving a downlink signal from a base station (BS); a transmitter for transmitting an uplink signal to the BS; and a processor operatively connected to the transmitter and the receiver, the processor configured to receive, through the receiver, downlink control information (DCI) including a CSI request field from the BS over a physical downlink control channel (PDCCH), and transmit, through the transmitter, CSI reporting of a single downlink carrier or CSI reporting of multiple downlink carriers to the BS over a physical uplink shared channel (PUSCH) without transmitting uplink data, wherein, when the CSI request field has a value of '01', a number (NPRB) of resource blocks (RBs) established for the CSI reporting is identical to or less than X (NPRB≤X), and wherein, when the CSI request field has a value '10' or '11', the NPRB established for the CSI reporting is identical to or less than M (where M>X), wherein the CSI request field value of '01' further indicates that the CSI reporting is CSI reporting for a single downlink carrier, and the CSI request field value of '10' or '11' further indicates that the CSI reporting is CSI reporting for multiple downlink carriers, and wherein only a QPSK (Quadrature Phase Shift Keying) modulation scheme is applied to the CSI reporting for the single downlink carrier and the CSI reporting for the multiple downlink carriers.

* * * * *